US006381561B1

(12) United States Patent
Bomar, Jr. et al.

(10) Patent No.: US 6,381,561 B1
(45) Date of Patent: Apr. 30, 2002

(54) SYSTEM AND METHOD FOR ESTIMATING POST-COLLISION VEHICULAR VELOCITY CHANGES

(75) Inventors: John B. Bomar, Jr., San Antonio; David J. Pancratz, Helotes; Darrin A. Smith; Scott D. Kidd, both of San Antonio, all of TX (US)

(73) Assignee: Injury Sciences LLC, San Antonio, TX (US)

( * ) Notice: Subject to any disclaimer, the term of this patent is extended or adjusted under 35 U.S.C. 154(b) by 0 days.

(21) Appl. No.: 09/243,202

(22) Filed: Feb. 2, 1999

Related U.S. Application Data

(63) Continuation-in-part of application No. 09/018,632, filed on Feb. 4, 1998.

(51) Int. Cl.[7] .............................................. G05B 17/00

(52) U.S. Cl. ........................... 703/8; 702/142; 702/150

(58) Field of Search ............................... 703/8, 7, 6, 1; 345/339, 349, 340; 700/303; 702/33, 142, 150; 705/4

(56) References Cited

U.S. PATENT DOCUMENTS 5,317,503 A 5/1994 Inoue .......................... 700/90
5,469,628 A * 11/1995 Chartrand .................... 33/608

FOREIGN PATENT DOCUMENTS

EP 0 644 501 A1 9/1994 ........... G06F/17/60

OTHER PUBLICATIONS

"Use of Biomechanics to Respond to Low Impact Soft Tissue Cases," Nebraska Department of Insurance Newsletter (Fraude Division), vol. 1—Spring 1998, pp. 1–4.*

Wrexpert—product review, Biodynamics Research Corporation [retrieved Apr. 26, 2000]. Retrieved from the Internet<URL: www.biodynamicresearch.com/wrexpert.htm>.*

Hays, Daniel, "Biomechanics help fix auto fraud woes," National Underwriters (Property & Casualty/Risk & Benefits Management), vol. 102, No. 37, Sep. 1998, pp. 10–11+.*

McHenry Software (m–crash), 1995 [retrieved on Apr. 26, 2000]. Retrieved from Internet<URL: www.mchenrysoftware.com>.*

Bonnett, George, "Understanding Delta V From Damage," 1996, [retrieved on Apr. 26, 2000]. Retrieved from Internet <URL: www.rec.–tec.com/deltav.html>.*

WinCrash ARSoftware, [retireved Apr. 26, 2000]/ Retrieved from Internet<URL: www.arsoftware.com/arsw.htm>.*

EDCRASH, Engineering Eynamics Corporation, [retrieved Apr. 26, 2000]. Retrieved from Internet<URL: www.edccorp.com>.*

(List continued on next page.)

*Primary Examiner*—Kyle J. Choi
(74) *Attorney, Agent, or Firm*—Skjerven Morrill MacPherson LLP; Mark J. Rozman

(57) ABSTRACT

A system and method that utilizes information relating to vehicle damage information including damaged vehicle area information, crush depth of the damaged areas information, and vehicle component-by-component damage information to estimate the relative velocities of vehicles involved in a collision. The change in velocity is estimated using a plurality of methods, and a determination is made as to which method provided a result that is likely to be more accurate, based on the damage information, and the types of vehicles involved. The results from each method may also be weighted and combined to provide a multi-method estimate of the closing velocity. The methods include using crash test data from one or more sources, estimating closing velocity based on the principals of conservation of momentum, and estimating closing velocity based on deformation energy resulting from the collision.

38 Claims, 10 Drawing Sheets

OTHER PUBLICATIONS

CRASHEX, Fonda Engineering Associates, [retrieved Apr. 26, 2000]. Retrieved from Internet <URL: www.crashex-.com>.*

Nilsson–Ehle, A. (1983), 'Energy–based determination of velocity change in traffic accidents', *Int. J. of Vehicle Design*, vol. 4, No. 2, pp. 126–135.

Brach, Raymond M., 'Least Squares Collision Reconstruction', Detroit, MI, Engl, 1987, pp. 31–40.

Grimes, Wesley D. et al., 'Developing a Crush Profile Estimate by Balancing Impact Forces', Proceeding of the 1977 International Congress And Exposition, Detroit, MI, USA, Feb. 24–27, 1997, pp. 1–20.

Prasad, Aloke K., 'Coefficient of Restitution of Vehicle Structures and Its Use in Estimating the Total Del V in Automobile Collisions', Winter Annual Meeting of the American Society of Mechanical Engineer; Atlanta, GA, USA, Dec. 1–6, 1991, vol. 126, 1991, pp. 217–246.

McHenry and McHenry, "A Revised Damage Analysis Procedure for the CRASH Computer Program," Thirtieth Stapp Car Crash Conference Proceedings P–189, Oct. 1986, pp 333–344. SAE #861894.

Siegmund, Bailey and King, "Characteristics of Specific Automobile Bumpers in Low–Velocity Impacts," Accident Reconstruction: Technology and Animation SP–1030, Feb. 1994, pp. 333–370. SAE #940916.

King, Siegmund and Bailey, "Automobile Bumper Behavior in Low–Speed Impacts," International Congress and Exposition Detroit, Michigan, Mar. 1993. SAE #930211.

Bailey, Wong and Lawrence, "Data and Methods for Estimating the Severity of Minor Impacts," Accident Reconstruction: Technology and Animation V SP–1083, Feb. 1995, pp 139–175. SAE #950352.

Hight and Fugger, "Automobile Damage Scales and the Effect on Injury Analysis," Accident Reconstruction: Technology and Animation II SP–907, Feb. 1992, pp. 117–127. SAE #920602.

Woolley, STrother and James, "Rear Stiffness Coefficients Derived from Barrier Test Data," Accident Reconstruction: Technology and Animation SP853, Feb. 1991, pp. 9–24. SAE #910120.

Prasad, CRASH3 Damage Algorithm Reformulation for Front and Rear Collisons, Accident Reconstruction: Human, Vehicle and Environmental Factors SP–814, Feb. 1990, pp. 1–10. SAE #900098.

Bailey, King, Romilly and Thomson, "Characterization of Automotive Bumper Components for Low Speed Impacts," Proceedings of the Canadian Multidisciplinary Road Safety Conference VII, Jun. 1991, pp. 190–203.

Howard, Bomar and Bare, "Vehicle Restitution Response in Low Velocity Collisions," 1993 SAE Future Transporation Technology Conference San Antionio, Texas, Aug. 1993, pp. 1–10. SAE #931842.

Robinette, Fay and Paulsen, "Delta–V: Basic Concepts, Computational Methods, and Misunderstandings," Accident Reconstruction: Technology and Animation IV SP–1030, Feb. 1994, pp 309–332. SAE #940915.

Campbell, "Energy Basis for Collison Severity," 1974. SAE #740565.

Strother, Woolley and James, "A Comparison Between NHTSA Crash Test Data and CRASH3 Frontal Stiffness Coefficients," Accident Reconstruction: Human, Vehicle and Environmental Factors SP–814, Feb. 1990, pp27–37. SAE #900101.

Prasad, "Energy Absorbing Properties of Vehicle Structures and Their Use in Estimating Impact Severity in Automobile Collisions," *IMechE* 1992, pp 61–72. SAE #925209.

Siddall and Day, "Updating the Vehicle Class Categories," Accident Reconstruction: Technology and Animation VI SP–1150, Feb. 1996, pp. 271–280. SAE #960897.

Prasad, "Energy Dissipated in Vehicle Crush–A Study Using the Repeated Test Technique," Vehicle Crashworthiness and Occupant Protection in Frontal Collisions SP–807, Feb. 1990, pp. 17–27. SAE #900412.

Siegmund, King and Montgomery, "Using Barrier Impact Data to Determine Speed Change in Aligned, Low–Speed Vechicle to Vehicle Collisons,:" Accident Reconstruction: Technology and Animation VI SP–1150, pp. 147–168. SAE #960887.

Strother, Woolley, James and Warner, "Crush Energy in Accident Reconstruction," Passenger Comfort, Convenience and Safety: Test Tools and Procedures P–174, Feb. 1986, pp. 257–273. SAE #860371.

* cited by examiner

SYSTEM AND METHOD FOR ESTIMATING POST-COLLISION VEHICULAR VELOCITY CHANGES

BACKGROUND OF THE INVENTION

This application is a continuation-in-part under 37 C.F.R 1.53(b) of U.S. patent application Ser. No. 09/018,632 which was filed on Feb. 4, 1998, is assigned to the same assignee as the present application, and is incorporated by reference in its entirety.

FIELD OF THE INVENTION

This invention relates to electronic systems and more particularly relates to a system and method for quantifying vehicular damage information.

DESCRIPTION OF THE RELATED ART

Vehicular accidents are a common occurrence in many parts of the world and, unfortunately, vehicular accidents, even at low impact and separation velocities, are often accompanied by injury to vehicle occupants. It is often desirable to reconcile actual occupant injury reports to a potential for energy based on vehicular accident information. Trained engineers and accident reconstruction experts evaluate subject vehicles involved in a collision, and based on their training and experience, may be able to arrive at an estimated change in velocity ("ΔV") for each the subject vehicles. The potential for injury can be derived from knowledge of the respective ΔV's for the subject vehicles.

However, involving trained engineers and accident reconstruction experts in all collisions, especially in the numerous low velocity collisions, is often not cost effective.

SUMMARY OF THE INVENTION

In one embodiment of the present invention, a computer program product, encoded in computer readable media, includes program instructions, which, when executed by a processor, are operable to receive input information regarding damaged vehicle components for at least one vehicle, categorize damage zones with respect to the location of the bumper of a vehicle, categorize a vehicle component with respect to its location on the vehicle, and estimate the change in the vehicle's velocity as a result of a collision based on the damaged vehicle components information. The information regarding damaged vehicle components includes particular damaged vehicle components, locations of damaged vehicle components, depth information corresponding to the damaged vehicle components, and an overall vehicle damage rating.

In a further embodiment, a computer system executing the computer program product is operable to compare the overall vehicle damage rating to a crash test vehicle damage rating, and to estimate whether to use crash test data to determine the change in the vehicle's velocity, based on the comparison and the location of damaged components. The executing computer program product further compares characteristics of a damaged vehicle to characteristics of vehicles for which crash test data is available, and determines whether crash test data for a particular vehicle is applicable to the damaged vehicle. The executing computer program product then determines a coefficient of restitution to use in estimating the change in the vehicle's velocity.

In a further embodiment, the executing computer program product is operable to estimate the change in the vehicle's velocity based either on the crash data, or the on conservation of momentum. The change in vehicle velocity is later input to a multi-method change in velocity combination generator.

In a further embodiment, the computer program product includes a change in velocity determination module which computationally estimates the change in ok vehicle velocity based on estimates of deformation energy and principal forces. Deformation energy may be estimated using a one-way spring model. Principal forces may be estimated based on at least one stiffness parameter and the damage depth information. In a further embodiment, the executing computer program product is operable to compare principal forces for at least two vehicles and determine whether the stiffness parameters, the depth information, and/or the principal forces may be adjusted within predetermined thresholds to substantially balance the principal forces.

In a further embodiment, the executing computer program product is operable to estimate closing velocity based on an estimate of a coefficient of restitution. A distribution of changes in velocity may be determined by varying parameters used to estimate the change in velocity. Statistical error functions in the distribution of changes in velocity may also be estimated and used to vary the parameters. In a further embodiment, distribution of changes in velocity are estimated using stochastic simulation.

In a further embodiment, the computer program product includes override/underride logic that is operable to determine stiffness parameters based on the position of the vehicle's bumper relative to the position of another vehicle's bumper.

In a further embodiment, the computer program product includes a multi-method change in velocity generator that is operable to estimate the change in the vehicle's velocity as a result of a collision based on a plurality of estimation methods including estimation based on one set of crash test data, estimation based on another set of crash test data, and estimation based on conservation of momentum. In a further embodiment, the results of each estimation method are weighted and combined to determine a final estimate for the change in the vehicle's velocity. In a further embodiment, the results for each estimation method may be weighted using a statistical method, such at the t-test.

In another embodiment, a computer-implemented method for estimating the change in velocity of a vehicle as a result of a collision, is provided which includes

- acquiring information regarding damaged components of at least one vehicle,
- assigning a damage rating to the at least one vehicle,
- determining whether to utilize crash test data for a first estimate of the change in velocity for the at least one vehicle based at least partially on the damage rating,
- determining a second estimate of the change in velocity for the at least one vehicle based on conservation of momentum,
- determining a third estimate of the change in velocity for the at least one vehicle based on deformation energy, and
- determining a final estimate of the change in velocity for the at least one vehicle based on at least one of the first, second, and third estimates of the change in velocity.

In a further embodiment, the method includes determining whether to utilize crash test data for a first estimate of the change in velocity for the at least one vehicle based on the location of damaged components.

In a further embodiment, the method includes comparing the location of damaged components on vehicles involved in the same collision to determine whether to use crash test data to estimate the change in at least one of the vehicles' velocity.

In a further embodiment, the method includes comparing characteristics of a damaged vehicle to characteristics of vehicles for which crash test data is available, and determining whether crash test data for a particular vehicle is applicable to the damaged vehicle.

In a further embodiment, the method includes estimating principal forces based on at least one stiffness parameter and the depth information.

In a further embodiment, the method includes comparing principal forces for at least two vehicles and determining whether vehicle parameters may be adjusted within predetermined thresholds to substantially balance the principal forces.

In a further embodiment, the method includes determining a distribution of changes in velocity by varying parameters used to estimate the change in velocity and estimating statistical error in the distribution of changes in velocity.

In a further embodiment, the method includes varying parameters according to a stochastic simulation.

In a further embodiment, the method includes determining stiffness parameters based on the position of the vehicle's bumper relative to the position of another vehicle's bumper.

In a further embodiment, the method includes weighting the first, second, and third estimates of the change in velocity and combining the weighted estimates to determine the final estimate for the change in the vehicle's velocity.

In a further embodiment, the method includes using a statistical method for weighting the results of each estimation method.

BRIEF DESCRIPTION OF THE DRAWINGS

Features appearing in multiple figures with the same reference numeral are the same unless otherwise indicated.

FIG. 10 is an example of a graphical user interface for balancing forces on vehicles involved in a collision.

DETAILED DESCRIPTION OF THE PREFERRED EMBODIMENTS

The following description of the invention is intended to be illustrative only and not limiting.

Determining vehicular velocity changes ("ΔV") which occur during and after a collision is useful in evaluating the injury potential of occupants situated in the vehicle. Knowledge of the ΔV allows evaluators to, for example, reconcile vehicle occupant injury reports to injury potential and to detect potential reporting inaccuracies.

In most situations, the actual ΔV experienced by a vehicle in a collision ("subject vehicle") is unknown. A ΔV determination module utilizes one or more methodologies to acquire relevant data and estimate the actual ΔV experienced by the subject, accident subject vehicle ("subject vehicle"). The methodologies include estimating a subject vehicle ΔV based upon available and relevant crash test information and subject vehicle damage and include a ΔV crush determination module 216 (FIG. 2) which allows estimation of ΔV from crush energy and computation of barrier equivalent velocities ("BEV") using estimates of residual subject vehicle crush deformation and subject vehicle characteristics., Additionally, conservation of momentum calculations may be used to estimate and confirm a ΔV for one or more subject vehicles in a collision. Furthermore, the various methodologies may be selectively combined to increase the level of confidence in a final estimated ΔV.

Figure 1:
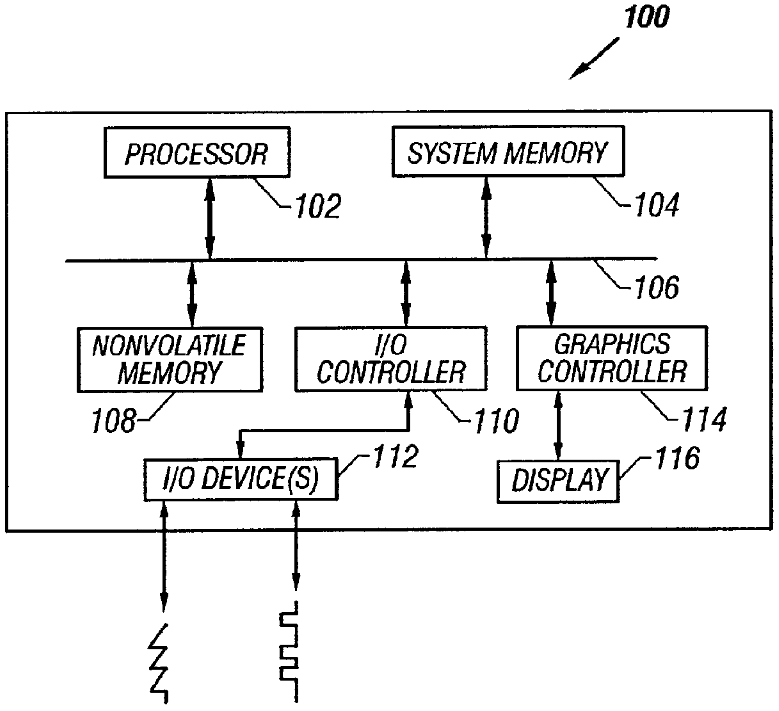
FIG. 1 is a computer system.

Referring to FIG. 1, a computer system 100 includes a processor 102 coupled to system memory 104 via a bus 106. Bus 106 may, for example, include a processor bus, local bus, and an extended bus. A nonvolatile memory 108,which may, for example, be a hard disk, read only memory ("ROM"), floppy magnetic disk, magnetic tape, compact disk ROM, other read/write memory, and/or optical memory, stores machine readable information for execution by processor 102. Generally, the machine readable information is transferred to system memory 104 via bus 106 in preparation for transfer to processor 102 in a well-known manner. Computer system 100 also includes an I/O ("input/output") controller 110 which provides an interface between bus 106 and I/O device(s) 112. In a well-known manner, information received by I/O controller 110 from I/O device (s) 112 is generally placed on bus 106 and in some cases stored in nonvolatile memory 108 and in some cases is utilized directly by processor 102 or an application executing on processor 102 from system memory 104. I/O device (s) 112 may include, for example, a keyboard, a mouse, and a modem. A modem transfers information via electronic data signals between I/O controller 110 and an information source such as another computer (not shown) which is coupled to the modem via, for example, a conductive media or electromagnetic energy.

Computer system 100 also includes a graphics controller 114 which allows computer system 100 to display information, such as a windows based graphical user interface, on display 116 in a well-known manner. It will be understood by persons of ordinary skill in the art that computer system 100 may include other well-known components.

Figure 2:
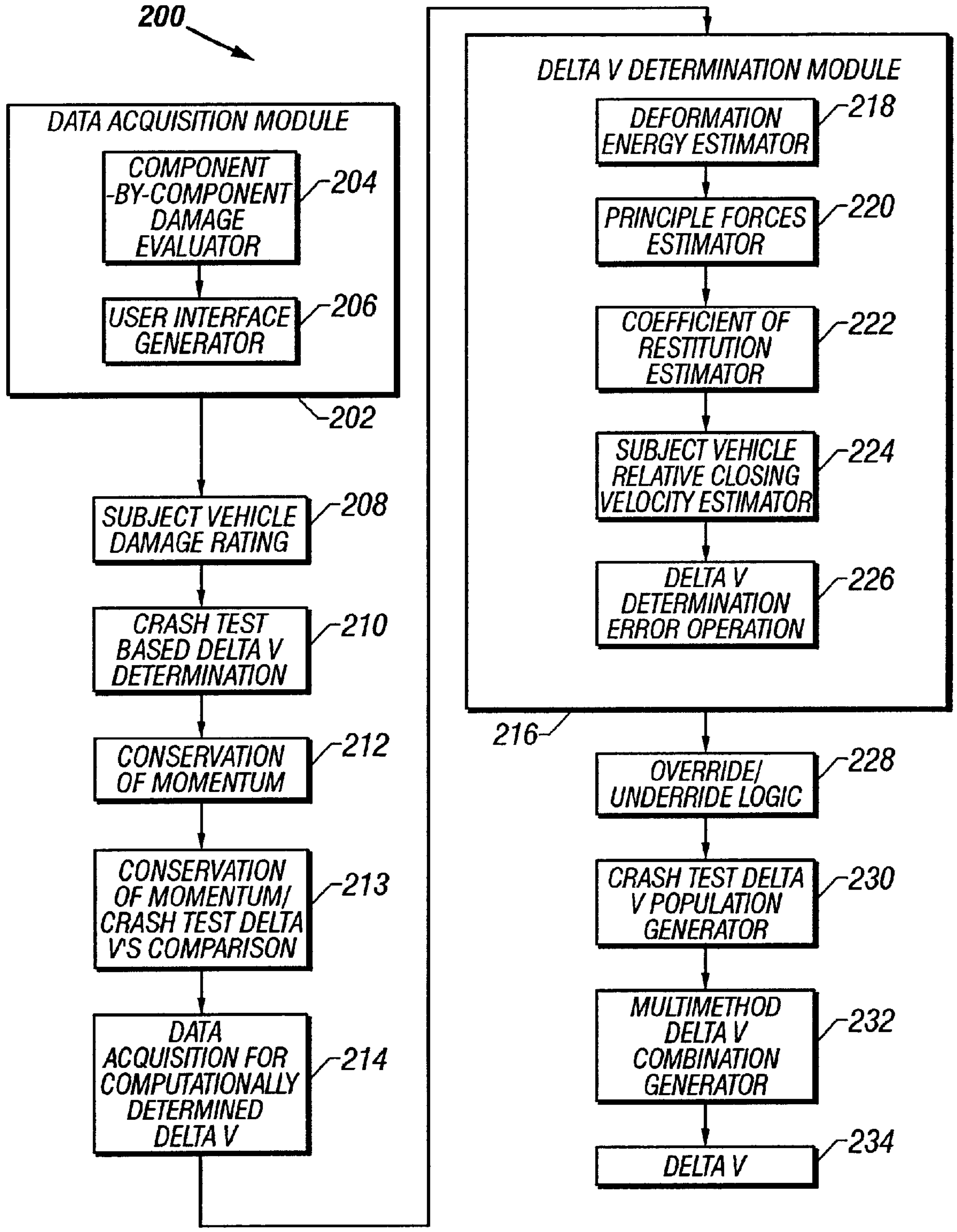
FIG. 2 is a ΔV determination module for execution on the computer system of FIG. 1.

Referring to FIG. 2, a ΔV determination module 200 is generally machine readable information disposed in a machine readable medium which may be executed by processor 102 (FIG. 1). Machine readable media includes nonvolatile memory 108, volatile memory 104,and the electronic data signals used to transfer information to and from I/O device(s) 112, such as a modem. ΔV determination module 200 includes data acquisition module 202 which facilitates receipt of subject vehicle information for determining a subject vehicle ΔV based upon available and relevant crash test information. As described in more detail below, the information may also be utilized to combine determined subject vehicle ΔV's and adjust stiffness factors used to estimate subject vehicle ΔV's in ΔV crush determination module 216.

Component-by-Component Damage Rating Assignment.

To use subject vehicle data acquired in data acquisition module 202, crash test data is assigned a component-by-component rating. Crash test data is available from various resources, such as the Insurance Institute for Highway Safety (IIHS) or Consumer Reports (CR). The crash test data is derived from automobile crash tests performed under controlled circumstances. IIHS crash data is provided in the form of repair estimates and is more quantitative in nature than CR crash test data. The CR crash test results are more qualitative in nature and are frequently given as a verbal description of damage. Thus, the confidence level in the CR crash test result component-by-component rating is slightly lower than that of the IIHS tests.

A uniform component-by-component damage rating assignment has been developed for, for example, IIHS and CR low velocity crash data and for acquired subject vehicle crash data which allows comparison between the crash test information and the subject accident. The component-by-component damage rating assignment is an exemplary process of uniform damage quantification which facilitates ΔV estimations without requiring highly trained accident reconstructionists.

In one embodiment, the component-by-component damage rating assignment rates the level of damage incurred in the IIHS barrier test based on the repair estimate information provided by IIHS. The rating system looks at component damage and the severity of the damage (repair or replace) to develop a damage rating. This damage rating is then compared with a damage rating for the subject accident using the same criteria and the repair estimate from the subject accident. The same rating system was used to rate the CR bumper basher test results based on the verbal description of the damaged components.

In component-by-component damage evaluator 204, subject vehicle damage patterns are identified and rated on a component-by-component basis to relate to crash test rated vehicles as described in more detail below.

Figure 3:
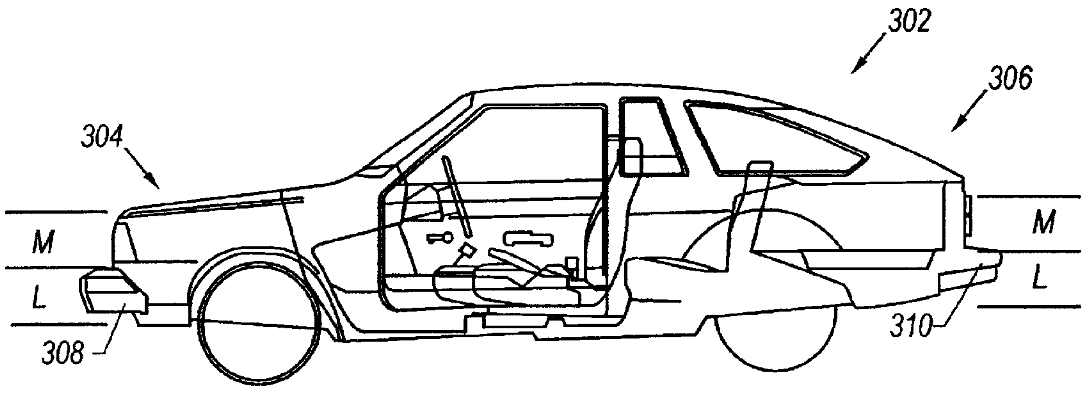
FIG. 3 is an exemplary vehicle for indicating damage zones.

Referring to FIG. 3, a side view of a typical subject vehicle 302 includes a front portion 304 and rear portion 306 which can be divided into two zones to describe the damage to the subject vehicle 302. One zone is at the level of the bumper (level "L"), and one zone is between the bumper and the hood/trunk (level "M"). The "M" and "L" zones describe the specific vertical location of subject vehicle damage. Zone L contains bumper level components, and Zone M contains internal and external components directly above the bumper level and on the subject vehicle sides.

In one embodiment, damage to the front and rear bumpers 308 and 310, respectively, are categorized into: damage to the external components of the bumper; damage to the internal components of the bumper; and damage beyond the structures of the bumper. Thus, the damage to the subject vehicle 302 can be divided into two groups, Groups I and II, for zone "L". A third group, Group III, covers component damage beyond the bumper structure in zone "M".

| | |
|---|---|
| Group I. | External bumper components |
| | Bumper cover |
| | Impact strip |
| | Bumper guards |
| | Moulding |
| Group II. | Internal bumper components |
| | Energy absorber(s) |
| | 1. Isolators |
| | 2. Foam |
| | 3. Eggcrate |
| | 4. Deformable struts |
| | Impact bar or face bar |
| | Mounting brackets |
| | Front/Rear body panel |
| | Bumper unit |
| Group III. | Outermost external subject vehicle components |
| | Safety-related equipment |
| | 1. Headlamps/Taillamps |
| | 2. Turn lamps |
| | 3. Side marker lamps |
| | 4. Back up lamps |
| | Grille/Headlamp mounting panel |
| | Quarter panels/Fenders |
| | Hood panel/Rear deck lid |
| | Radiator support panel |

The component-by-component damage evaluator 204 rates damage components in accordance with the severity of component damage. In one embodiment, numerical ratings of 0 to 3, with 3 depicting the most severe damage, are utilized to uniformly quantify damage. The ratings indicate increasing damage to the subject vehicles in the crash tests. For example, a "0" rating in zone "L" indicates no or very minor damage to the subject vehicle. A rating of "3" in zone L indicates that the subject vehicle's bumper to prevent damage has been exceeded and there is damage beyond the bumper itself. Thus, the results of crash tests can be compared with damage to a subject vehicle entered into computer system 100 via an input/output device(s) 112. For example, if a bumper is struck and only has a scuff on the bumper cover requiring repair, a damage rating of "0" is assigned to level "L" based on this low severity of damage. Similarly, if the radiator of the other subject vehicle is damaged along with other parts, it would be assigned a rating of "3" for zone "L". Although a barrier impact test is not an exact simulation for a bumper-to-bumper impact, the barrier impact test is a reasonable approximation for the bumper-to-bumper impact. Additionally, conservative repair estimates result in overestimating of ΔV, and overestimating ΔV will result in a more conservative estimate for injury potential. Table 1 defines damage ratings for Groups I, II, and III components based on damage listed in repair estimates.

TABLE 1

| | Group I Components | Group II Components | Group III Components |
|---|---|---|---|
| No Damage | 0 | | |
| Repair | 0 | 1 | 3 |
| Replace | 1 | 2 | 3 |

The "3" rating indicates structures beyond the bumper have been damaged, and it is generally difficult to factor the level of damage above the bumper into the rating for the bumper. Thus, in one embodiment, to simplify the rating system, a rating of "3" for zone "L" makes the use of the crash tests invalid in the ΔV determination module 200.

A similar damage rating system can be developed for zone "M", the areas beyond the bumper, for the purpose of determining override/underride.

The damage in zone "L" and zone "M" is separately evaluated to evaluate the possibility of bumper override/underride. For example, if the front bumper 308 of subject vehicle 302 is overridden, there would be little or no damage in zone "L" and moderate to extensive damage in zone "M".

As with the zone "L" group, the damage in zone "M" can be categorized by the extent of damage. The subject vehicle components in zone "M" for the front of the subject vehicle 302 can also be divided into three groups:

| | |
|---|---|
| Group I. | Grille/Safety Equipment |
| | Grille<br>Headlamp housing, headlamp lens<br>Turnlamp housing, turnlamp lens<br>Parklamp housing, parklamp lens |
| Group II. | External body panels |
| | Hood panel<br>Fenders |
| Group III. | Radiator/Radiator Support/Unibody |
| | Radiator support panel<br>Radiator<br>Valence panel<br>Unibody/frame structure |

Table 2 below defines a damage rating in zone "M" for the front 304 of the subject vehicle 302.

TABLE 2

| | Group I Components | Group II Components | Group III Components |
|---|---|---|---|
| No Damage | 0 | | |
| Repair | 0 | 2 | 3 |
| Replace | 1 | 3 | 3 |

The subject vehicle components in zone "M" for the rear 306 of subject vehicle 302 can also be divided into three groups:

| | |
|---|---|
| Group I. | Outermost subject vehicle components |
| | Taillamp housing, taillamp lens<br>Turnlamp housing, turnlamp lens<br>Rear body panel |
| Group II. | Rear body structures |
| | Rear deck lid (Tailgate shell -- vans, mpv's, wagons)<br>Quarter panels<br>Rear floor plan |
| Group III. | Forward components (components ahead of the rear bumper 310) |
| | Rear wheels<br>Rear roof pillars<br>Rear doors<br>Unibody/frame structures |

Table 3 defines a damage rating to zone "M" for the rear 306 of the subject vehicle 302.

TABLE 3

| | Group I Components | Group II Components | Group III Components |
|---|---|---|---|
| No Damage | 0 | | |
| Repair | 1 | 2 | 3 |
| Replace | 1 | 3 | 3 |

Component-by-component damage ratings are also assigned to a subject vehicle by component-by-component damage evaluator 204. The components of the subject vehicle are divided into zones "L" and "M" as shown in FIG. 3 and a damage rating is assigned in accordance with Tables 1, 2, and 3. In the event that a repair estimate or component replacement data is unavailable, the damage rating for zones "L" and "M" is inferred from visual estimates of the subject vehicle damage. Table 4 shows subject vehicle components which might be damaged in front/rear collisions. A description of the visual damage that is likely to be sustained by these components and the repair estimate inference from the damage is also provided. This information is used to assign single digit damage codes for each of zones "L" and "M". The table columns for the codes assume only the part damaged in the manner described. It does not take into account multi-component damage or the damage hierarchy discussed in Tables 1–3. Visual ratings are preferably not used if a repair estimate is available for the subject vehicle. As with Tables 1–3, the component damage ratings are assigned to indicate increasing levels of component damage. Bumper components have no zone "M" rating. As shown in Table 1, any parts which are damaged in any manner above or beyond the bumper results in a "3" rating for zone "L". This will preclude the use of the crash tests for the subject vehicle 302. A comparison of the level of damage to the bumper and the level of damage above the bumper is still used to evaluate the possibility of override/underride relative to the other subject vehicle in the collision.

TABLE 4

| Vehicle Component | Visual Description | Repair Estimate Inference | "L" Code* | "M" Code |
|---|---|---|---|---|
| Bumper | rotated, separated from body, dented, deformed | replace | 2 | NA |
| Bumper cover/face bar | scratched, smudged, scuffed, paint transfer | repair | 0 | NA |
| Bumper cover/face bar | cracked, dented, chipped, cut, deformed | replace | 1 | NA |

TABLE 4-continued

| Vehicle Component | Visual Description | Repair Estimate Inference | "L" Code* | "M" Code |
|---|---|---|---|---|
| Bumper guard | scratched, smudged, scuffed, paint transfer | repair | 0 | NA |
| Bumper guard | cracked, dented, chipped, cut, deformed | replace | 1 | NA |
| License plate bracket | scratched, smudged, scuffed, paint transfer | repair | 0 | NA |
| License plate bracket | cracked, dented, chipped, cut, deformed | replace | 0 | NA |
| Moulding | scratched, smudged, scuffed, paint transfer | repair | 0 | NA |
| Moulding | cracked, dented, chipped, cut, deformed | replace | 0 | NA |
| Impact strip | scratched, smudged, scuffed, paint transfer | repair | 0 | NA |
| Impact strip | cracked, dented, chipped, cut, deformed | replace | 0 | NA |
| Bumper step pad | scratched, smudged, scuffed, paint transfer | repair | 0 | NA |
| Bumper step pad | cracked, dented, chipped, cut, deformed | replace | 1 | NA |
| Energy absorbers | stroked, compressed | repair | 0 | NA |
| Energy absorbers | deformed, leaking, bottomed out | replace | 1 | NA |
| Grille | broken, cracked, chipped | replace | 3 | 1 |
| Lamp lenses/assemblies | broken, cracked, chipped | replace | 3 | 1 |
| Front/rear body panels | scratched, paint transfer | repair | 3 | 2 |
| Front/rear body panels | dented, deformed | replace | 3 | 3 |
| Front fender | scratched, paint transfer | repair | 3 | 2 |
| Front fender | dented, deformed | replace | 3 | 3 |
| Rear quarter panel | scratched, paint transfer | repair | 3 | 2 |
| Rear quarter panel | dented, deformed | replace | 3 | 3 |
| Hood | scratched, paint transfer | repair | 3 | 2 |
| Hood | dented, deformed | replace | 3 | 3 |
| Deck lid/tailgate shell | scratched, paint transfer | repair | 3 | 2 |
| Deck lid/tailgate shell | dented, deformed | replace | 3 | 3 |

Figure 4A:
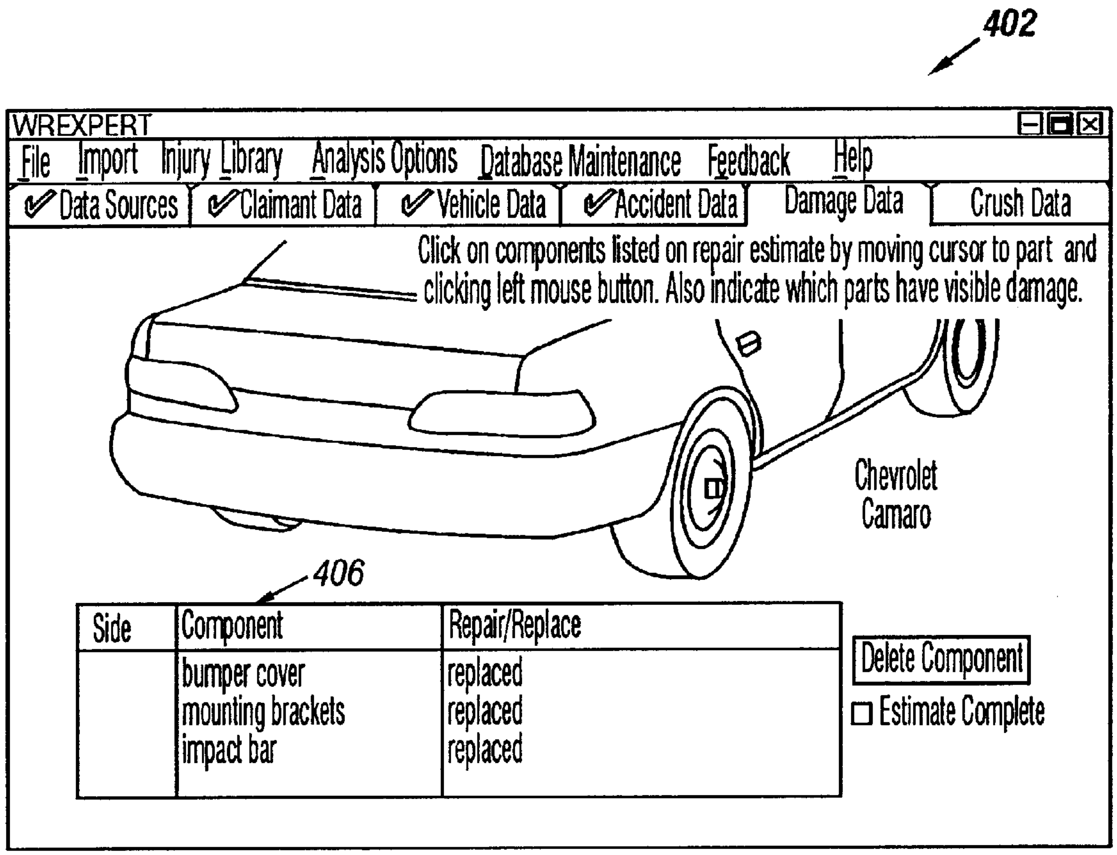
FIGS. 4A and 4B illustrate a graphical user interface which allows the ΔV crush determination module of FIG. 2 to acquire data on a subject vehicle.

Referring to FIG. 4A, the data acquisition module 202 provides a graphical user interfaces 402 and 404 with user interface generator 206 to allow a user to enter subject vehicle damage for use in generating a subject vehicle damage rating based upon component-by-component damage ratings and crash test subject vehicle comparisons. The user interface generator 206 provides graphical user interface 402 with an exemplary list 406 of subject vehicle components for the appropriate end of the subject vehicle 402 which in the embodiment of FIG. 4A is the rear end. Damaged subject vehicle components can be selected from the list 406 to create a list of damaged components. For each damaged component, the graphical user interface 402 allows a user to select whether components were repaired or replaced for subject vehicles with a repair estimate. The data acquisition module 202 then determines the appropriate damage rating for the subject vehicle in the subject accident according to Tables 1 and 2.

Figure 4B:
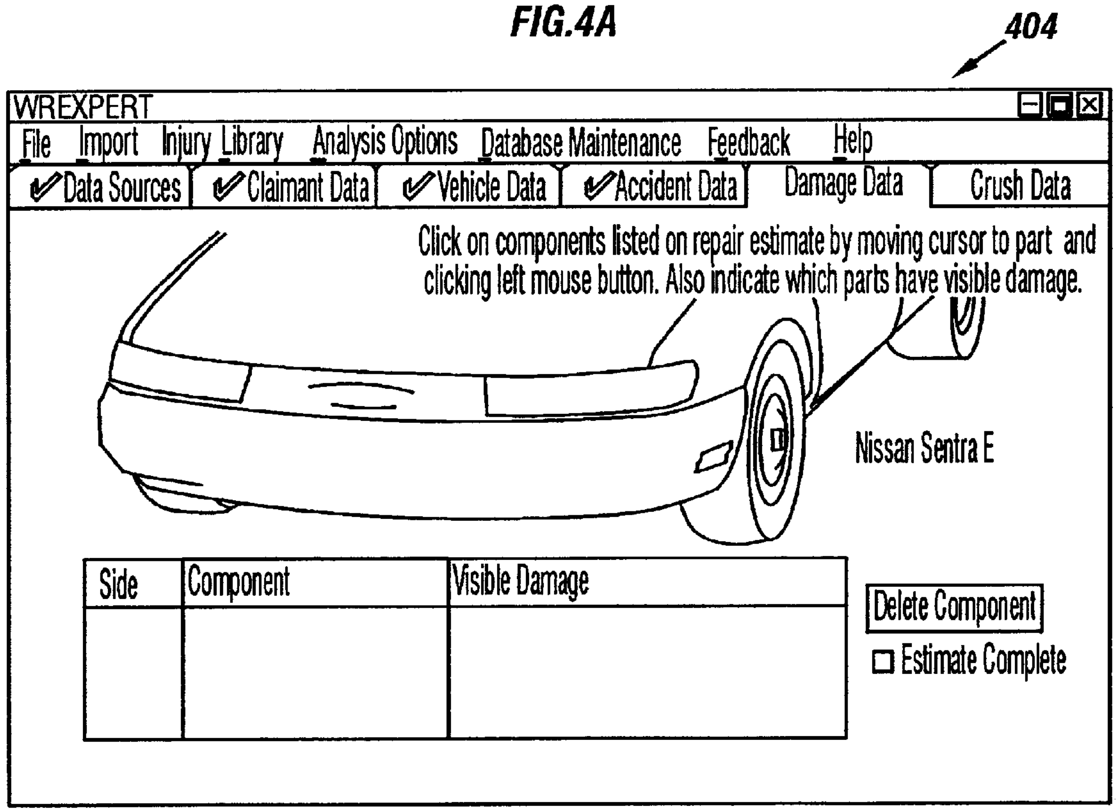

Referring to FIG. 4, the graphical user interface 404 allows a user to select and indicate which, if any, components that do not have a repair estimate are visually damaged. Both front and rear (not shown) views of exemplary vehicle images are displayed by graphical user interface 404. The visual damage to the components is characterized via a selection of cosmetic or structural damage in accordance with Table 4. A rating to components with a visual damage estimate only is assigned in accordance with Table 4.

After damage ratings have been assigned on the component-by-component basis, an overall subject vehicle damage rating is assigned in subject vehicle damage rating operation 208 to the two crash test subject vehicles and to the subject vehicle based upon the component-by-component ratings assigned in accordance with Table 1. The subject vehicle damage rating corresponds to the highest rating present in Table 1 for that subject vehicle. For example and referring to Table 1, if any Group III components are replaced or repaired, the subject vehicle is assigned a damage rating of 3. If any Group II components are replaced, the subject vehicle is assigned a damage rating of 2. If any Group II components are repaired or any Group I components are replaced, the subject vehicle is assigned a damage rating of 1. If any Group I components are repaired or no damage is evident, the subject vehicle is assigned a damage rating of 0.

Determination of ΔV Based on Subject Vehicle Damage Ratings

In crash test based ΔV determination operation ("crash test ΔV operation") 210, the subject vehicle damage rating is compared to an identical crash test vehicle damage rating, if available, or otherwise to a sister vehicle crash test vehicle damage rating to determine whether or not crash test based ΔV's should be used. As depicted in Table 1, if a subject vehicle overall damage rating is greater than a respective crash test based sister vehicle overall damage rating, the respective crash test information is not used in estimating a ΔV for the subject vehicle.

TABLE 5

| Crash Test Vehicle | Subject vehicle Damage Rating | | | |
|---|---|---|---|---|
| Damage Rating | 0 | 1 | 2 | 3 |
| 0 | A | X | X | X |
| 1 | A | A | X | X |
| 2 | A | A | A | X |
| 3 | A | A | A | X |

An "A" in Table 5 indicates that the respective crash test based information may be used by crash test ΔV operation 210 to determine a ΔV for the subject vehicle, and an "X" in Table 5 indicates that the subject vehicle received more damage than the IIHS crash test subject vehicles and, thus, the IIHS crash test is not used by crash test ΔV operation 210 to obtain a subject vehicle ΔV. When Group III components in the subject vehicle were damaged, a crash based subject vehicle ΔV is not estimated by ΔV determination module 200.

In one embodiment, crash test ΔV operation 210 uses the IIHS and CR crash test information to develop ΔV estimates. The crash tests preferably considered in crash test ΔV operation 210,the IIHS and CR crash tests, are conducted under controlled and consistent conditions. While the closing velocities i.e. barrier equivalent velocities ("BEV") are known in these tests, the coefficient of restitution is not known. The coefficient of restitution ranges from 0 to 1 and has been shown to vary with the closing velocity. The coefficient of restitution can be estimated using data from vehicle-to-barrier collisions of known restitution. For IIHS tests, the coefficient of restitution versus vehicle weight is plotted in FIG. 8. The coefficient of restitution for test vehicles in the CR crash tests is estimated to have a mean of 0.5 with a standard deviation of 0.1.

The assignment of ΔV based on crash test comparisons is generally based on the assumption that a bumper-to-bumper impact is simulated by a barrier-to-bumper impact.

The barrier-to-bumper impact is a flat impact at the bumper surface along the majority of the bumper width. The bumper-to-barrier impact is a reasonable simulation for the accident if the contact between two subject vehicles is between the bumpers of the subject vehicles along a significant portion of the respective bumper widths, for example, more than one-half width overlap or more than two-thirds width overlap. If any subject vehicle receives only bumper component damage, then a crash based test determined ΔV may be performed based on the outcome of vehicle rating comparisons in Table 1. If the impact configuration entered during execution of data acquisition module 202 includes any damage to any components in zone M, a bumper height misalignment may exist, i.e. override/underride situation. In one embodiment, if components in zone M are damaged, a crash test based ΔV estimation will not be directly used for the subject vehicle with damage to any zone M component because the impact force may have exceeded the bumper's ability to protect structures above or beyond the bumper. In another embodiment, if components in zone M receive only minor or insubstantial damage, such as headlight or taillight glass breakage, a crash test based ΔV estimation will be used in multi-method ΔV combination generator 232.

In one embodiment, the assumption of bumper-to-bumper contact is evaluated by crash test ΔV operation 210 by considering the damage patterns exhibited by both subject vehicles. If there is no damage to either subject vehicle or there is evidence of damage to the bumpers of both subject vehicles, then a bumper-to-bumper collision will be inferred by crash test ΔV operation 210. This inference will be confirmed with the user through a graphical user interface displayed inquiry produced by user interface generator 206 since the user may have additional information not necessarily evident from the damage patterns. In the event of a bumper height misalignment, crash test ΔV operation 210 will infer from the damage patterns the override/underride situation. Again, the inference will be confirmed with the user through a graphical user interface displayed inquiry. In the At override/underride situation, crash test ΔV operation 210 would estimate a ΔV based on crash test information only for the subject vehicle with bumper impact. The subject vehicle having an impact above/below the bumper would fail the bumper-to-bumper collision requirement. If the damage patterns are such that the program cannot infer override/underride, crash test ΔV operation 210 will request the user, through a graphical user interface displayed inquiry, to specify whether override/underride was present and which subject vehicle overrode or underrode the other.

Crash test vehicle information is utilized by crash test ΔV operation 210 to estimate a subject vehicle ΔV if the crash test vehicle is identical or similar ("sister vehicle") to the subject vehicle. To determine if a crash test vehicle is a identical or a sister vehicle to the subject vehicle, damage on a component by component basis can be determined, and, if components remain the same over a range of years, the crash test information may be extended to crash test results over the range of years for which the bumper and its components have remained the same. Mitchell's Collision Estimating Guide (1997) ("Mitchell") by Mitchell International, 9889 Willow Creek Road, P.O. Box 26260, San Diego, Calif. 92196 and Hollander Interchange ("Hollander") by Automatic Data Processing (ADP) provide repair estimate information on a subject vehicle component level. The parts are listed individually and parts remaining the same over a range of years are noted in Mitchell and Hollander.

In addition, subject vehicles with the same bumper system, same body and approximately the same weight are considered sister subject vehicles as well. For example, a make and model of a subject vehicle have different trim levels but the same type of bumper system. It is reasonable to expect the bumper system on such a subject vehicle to perform in a similar manner as the crash tested subject vehicle if the subject vehicle weights are similar (e.g. within 250 lb.). Likewise, subject vehicles of different models but the same manufacturer (e.g. Pontiac Transport™, Chevrolet APV™, Chevrolet Lumina™, and Oldsmobile Silhouette™ vans) or subject vehicles of different makes and models (e.g. Geo Prizm™ and Toyota Corolla™) with the same bumper system and body structure as the crash tested subject vehicle should be expected to perform in the same manner. The weight of the identical or sister crash tested vehicle versus the subject vehicle should be taken into consideration when determining whether a damage rating can be assigned because the assumption is that the subject vehicle would experience a similar force on a similar structure since force depends on mass.

Figure 8:
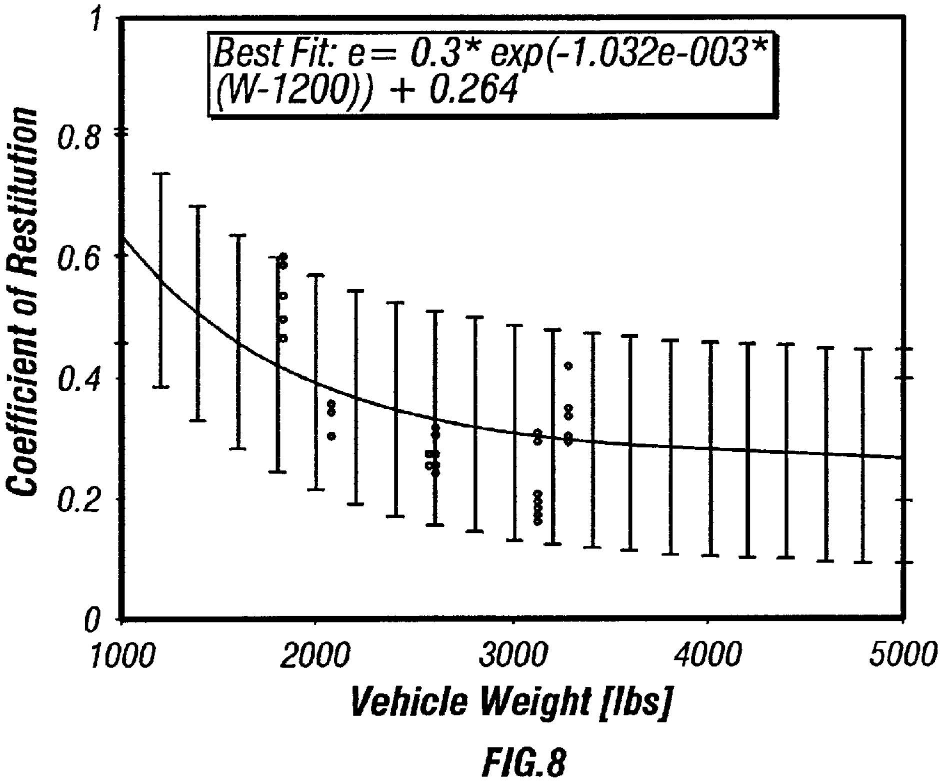
FIG. 8 is a coefficient of restitution versus vehicle weight plot.

Referring to FIG. 8, a plot of the coefficient of restitution, e, versus vehicle weight for IIHS for use in determining subject vehicle ΔV from IIHS crash test information is shown. ΔV is related to the test vehicle coefficient of restitution in accordance with equation [0]:

$$\Delta V=(1+e)V \quad [0]$$

where v is the actual velocity of a test vehicle in the IIHS crash test. The IIHS crash test is conducted by running the test vehicle into a fixed barrier with a v of 5 miles per hour ("mph"), and the IIHS crash test vehicle weight is known or can be approximately determined by identification of the make and model.

A best fit curve for the data points plotted in FIG. 8 is shown as a solid line. Upper and lower bounds for the coefficient of restitution corresponding to a particular vehicle weight are also shown spanning either side of the best fit curve. Crash test ΔV operation 210 determines a population of coefficients of restitution using the best fit curve data point corresponding to a particular subject vehicle weight as a mean and assuming a normal distribution of the coefficients of restitution within the indicated upper and lower bounds. The population of, for example, one thousand coefficients of restitution are applied in equation 0 by crash test ΔV operation 210 to obtain a population of ΔV's for the subject vehicle based on IIHS crash test vehicle information. This IIHS based ΔV population is subsequently utilized by multi-method ΔV combination generator 232.

For CR crash tests, ΔV is related to the test vehicle coefficient of restitution, e, in accordance with equation [00]:

$$\Delta V=(1+e)V/2 \quad [00]$$

The CR crash test is conducted by running a sled of equal mass into a crash test subject vehicle. The crash test subject vehicle is not in motion at the moment of impact, and the CR crash test V is 5 mph for front and rear collision tests and 3 mph for side collision tests. Assuming a mean coefficient of restitution of 0.5 and a standard deviation of 0.1, crash test ΔV operation 210 utilizes a normal distribution of coefficients of restitution for the CR crash test, bounded by the standard deviation, to obtain a population of CR crash test based ΔV's using equation 0. The CR based ΔV population is, for example, also a population of one thousand ΔV's, and is subsequently utilized by multi-method ΔV combination generator 232.

Conservation of Momentum

If both of the subject vehicles in the accident have a crash test, a conservation of momentum calculation is performed in the conservation of momentum operation 212 for each of the subject vehicles based on each of the crash test based ΔV determinations of the other subject vehicle. The conservation of momentum equation is generally defined in equation 1 as:

$$m_1 \cdot \Delta V_1 = m_2 \cdot \Delta V_2 + F\Delta t \quad [1]$$

where $m_1$ and $m_2$ are the masses of subject vehicles one and two, respectively, and $\Delta V_1$ and $\Delta V_2$ are the change in velocities for subject vehicles one and two, respectively. FΔt is a vector and accounts for external forces, such as tire forces, acting on the system during the collision and is assumed to be zero unless otherwise known.

The crash based ΔV's for each vehicle are used to determine a ΔV for the other vehicle. For example, the crash based ΔV's for a first subject vehicle are inserted as $\Delta V_1$ in equation 1 and used by conservation of momentum operation 212 to estimate ΔV's for the second subject vehicle, and visa versa. The ΔV's estimated by conservation of momentum operation 212 for the two subject vehicles are compared to the ΔV's estimated crash test ΔV operation 210, respectively, in conservation of momentum based/crash test based ΔV comparison operation 213. If the ΔV's from crash test ΔV operation 210 and conservation of momentum operation 212 are in closer agreement for the first subject vehicle than the similarly compared ΔV's for the second subject vehicle, then ΔV'estimated crash test ΔV operation 210 for the second subject vehicle are used in multi-method ΔV combination generator 232,and the conservation of momentum operation 212 based ΔV's are utilized in multi-method ΔV combination generator 232 for the first subject vehicle. Likewise, if the ΔV's from crash test ΔV operation 210 and conservation of momentum operation 212 are in closer agreement for the second subject vehicle than the similarly compared ΔV's for the first subject vehicle, then ΔV's determined in crash test ΔV operation 210 for the first subject vehicle are used in multi-method ΔV combination generator 232,and the conservation of momentum operation 212 based ΔV's are utilized in multi-method ΔV combination generator 232 for the second subject vehicle.

If only one of the subject vehicles has an applicable crash test(s), the ΔV's estimated in crash test ΔV operation 210 are used by conservation of momentum operation 212 to estimate the ΔV's for the other subject vehicle using equation 1 as described above.

Data Acquisition for Computationally Estimated ΔV

As discussed in more detail below, the ΔV determination module 200 utilizes a ΔV data acquisition module 214 to estimate ΔV for a subject vehicle in addition to the above described crash test based ΔV estimation. The ΔV computation module utilizes data input from users in the ΔV data acquisition module 214. Conventionally, the Campbell method provides an exemplary method to calculate subject vehicle ΔV; see Campbell, K., *Energy Basis for Collision Severity*, Society of Automotive Engineers Paper #740565, 1974, which is incorporated herein by reference in its entirety. Data entry used for conventional programs to determine ΔV generally required knowledge of parameters used in ΔV calculations and generally required the ability to make reasonable estimates and/or assumptions in reconstructing the subject vehicle accident.

Figure 5:
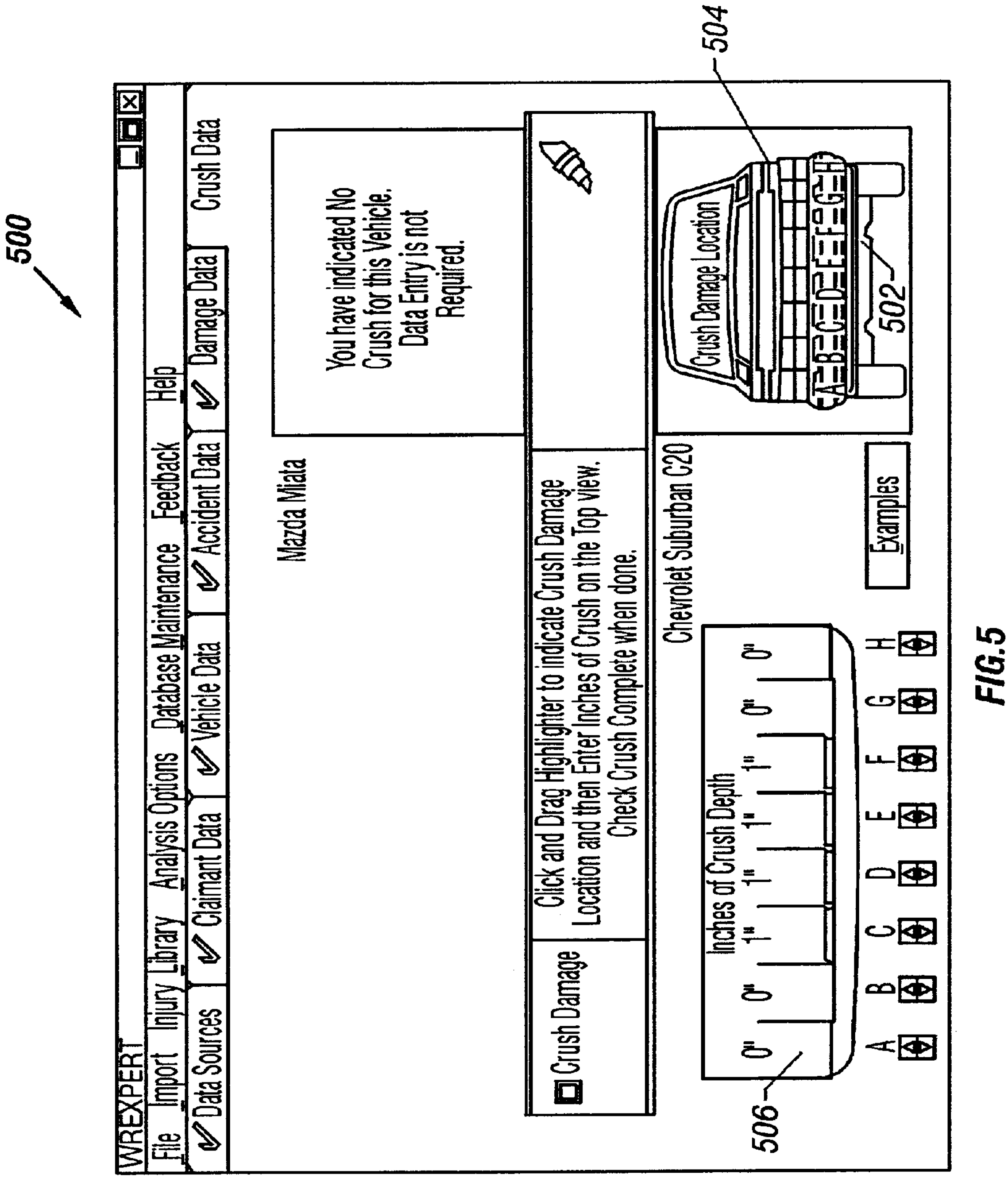
FIGS. 5, 5A, 6, 7A, 7B, and 10 are graphical user interfaces which allow the ΔV crush determination module of FIG. 2 to acquire and display information.

Referring to FIG. 5, the ΔV data acquisition module 214 enables users who are not trained engineers or accident reconstructionists to enter data necessary for estimating ΔV. The ΔV data acquisition module 214 allows a user to enter three-dimensional information from a two-dimensional generated interface. The ΔV data acquisition module 214 generates a graphical user interface 500 having a grid pattern 504 superimposed above the bumper of a representative subject vehicle 502,which in this embodiment is a Chevrolet Suburban C20™. The grid pattern includes eight (8) zones divided into columns, labeled A–H, respectively, and two rows. The user selects, using an I/O device 112 such as a mouse, grid areas which directly correspond to observed crush damage in a subject vehicle 502. In the embodiment of FIG. 5, crush damage to zones C through F is indicated. An overhead plan view display 506 allows the user to select crush depth to crushed areas of subject vehicle 502 by respectively selecting the arrow indicators. The selected crush depth is applied over the entire height of the crush zone. In the embodiment of FIG. 5, a crush depth of 1 inch has been selected for each of zones C through F. In this embodiment, a second subject vehicle, a Mazda Miata™, which was involved in a collision with the subject vehicle 502 did not have non-bumper crush damage, and, thus, the subject vehicle representation and crush depth displays are not generated for this second subject vehicle. Although eight crush zones are described, it will be apparent to persons of ordinary skill in the art that more or less crush zones may be included to increase or decrease, respectively, the resolution of crush damage.

Figure 5A:
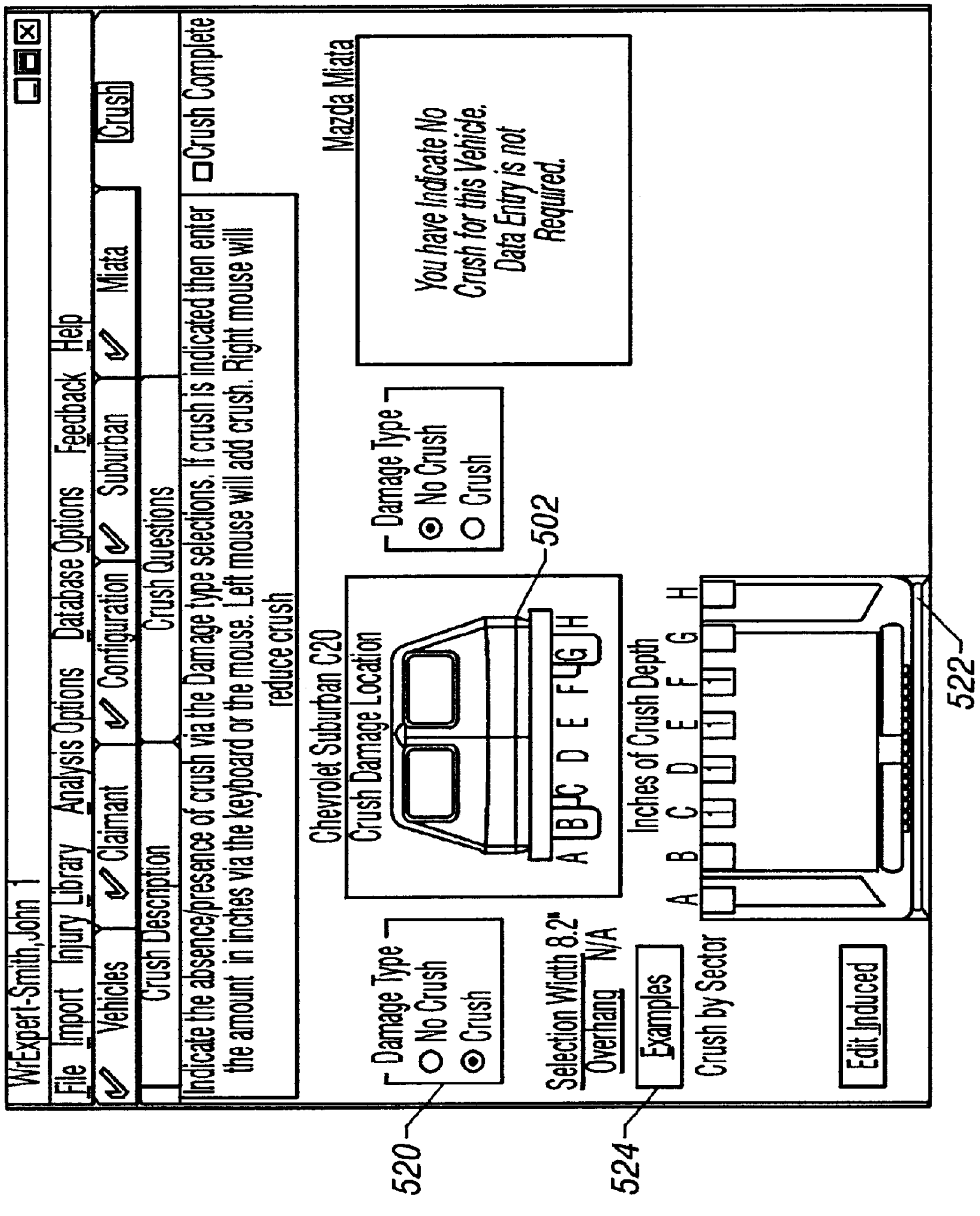

FIG. 5A shows an example of an alternative interface for entering crush zone information. The user indicates the absence or presence of crush damage by making the appropriate selection in damage type box 520. The grid pattern includes eight (8) zones divided into columns, labeled A–H, respectively. The user selects, using an I/O device 112 such as a mouse, grid areas which directly correspond to observed crush damage in the subject vehicle 502. In the embodiment of FIG. 5A, crush damage to zones C through F is indicated. An overhead plan view display 522 allows the user to enter the Amount of crush in appropriate units, such as inches, by respectively using the first mouse button and a second mouse button to increment or decrement the depth of the crush damage for the area. The selected crush depth is applied over the entire height of the crush zone. In the embodiment of FIG. 5A, a crush depth of 1 inch has been selected for each of zones C through F. In this embodiment, a second subject vehicle, a Mazda Miata™, which was involved in a collision with the subject vehicle 502 did not have non-bumper crush damage, and, thus, the subject vehicle representation and crush depth displays are not generated for this second subject vehicle. Although eight crush zones are described, it will be apparent to persons of ordinary skill in the art that more or less crush zones may be included to increase or decrease, respectively, the resolution of crush damage. By selecting the graphical user interface generated "Examples" object 524,the FIG. 6 graphical user interface is displayed.

Figure 6:
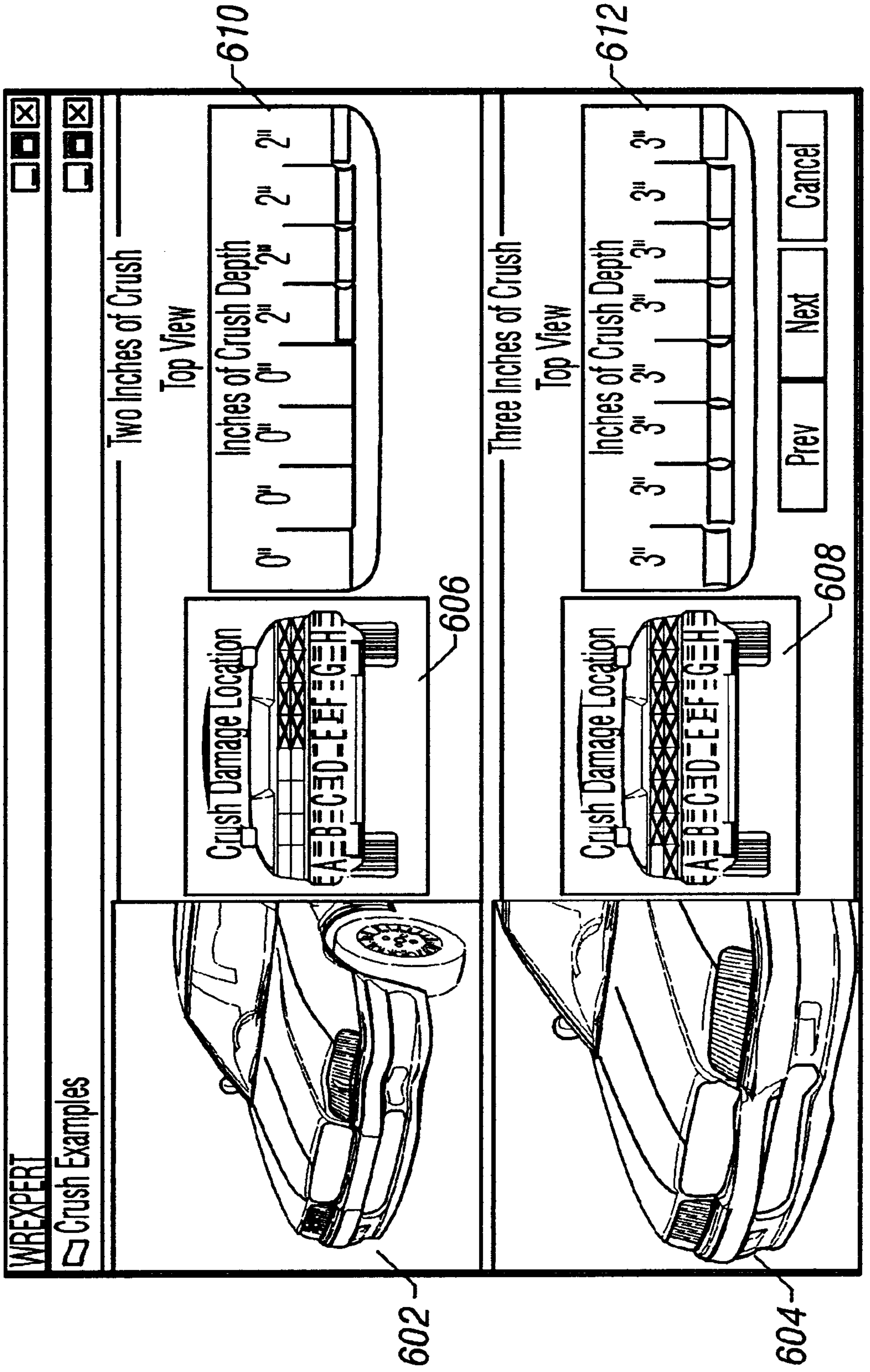

Referring to FIG. 6, exemplary, damaged subject vehicles are shown in conjunction with selectable crush zones on representative subject vehicles to assist a user in accurately estimating the crush depth of a subject vehicle. The ΔV data acquisition module 214 provides scrollable, exemplary subject vehicle images 602 and 604 and associated crush depth damage location and crush depth. A user may utilize the damage to subject vehicles images 602,and 604,associated crush depth locations 606 and 608, respectively, and illustrative crush depth from top plan views 610 and 612, respectively, to analogize to the damage to subject vehicle 502 (FIG. 5). In the embodiment of FIG. 6, exemplary subject vehicle 606 has 2 inch crush damage in zones F–H and zero (0) inch crush depth in zones A–D. Subject vehicle 608 has 3 inch crush damage in zones A–H.

Figure 7A:
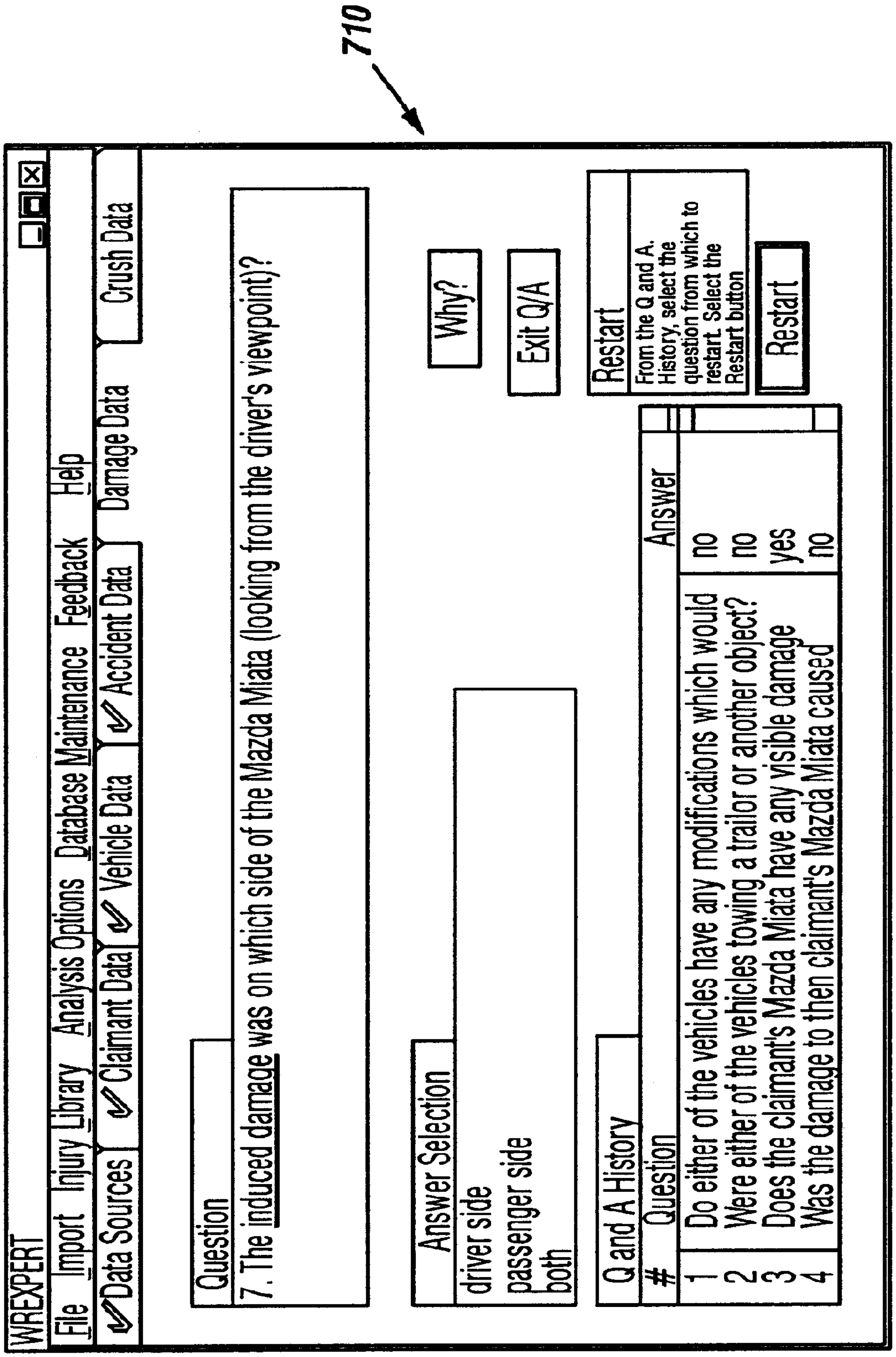
Figure 7B:
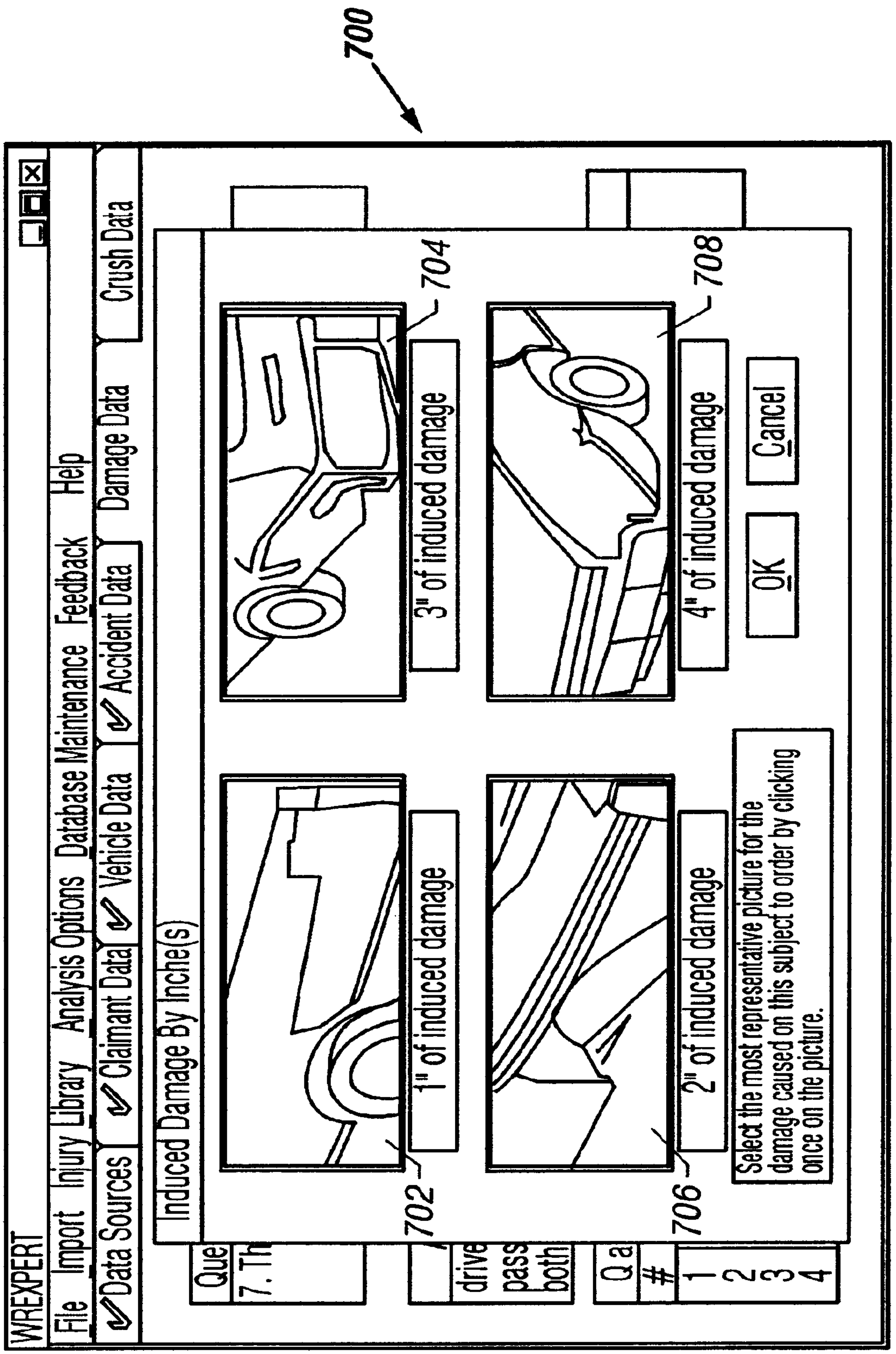

Referring to FIGS. 7A and 7B, collectively referred to as FIG. 7, ΔV data acquisition module 214 generates images of induced crush in a graphical user interface 700 to account for side crush damage to the subject vehicle (e.g. buckled quarter panel, crinkled fender well, etc.). This induced damage is caused indirectly from an impact to the bumper of the subject vehicle and is not caused by direct contact between the subject vehicles. This type of damage is generally difficult to quantify in terms of the extent of induced damage. However, the ΔV data acquisition module 214 provides a reasonable first estimate for a non-technical user. The ΔV data acquisition module 214 first determines the location of the induced damage on either the passenger side, driver side, or both via input data from the user using an answer selection field in the graphical user interface 710. Additionally, the graphical user interface 710 displays inquiry fields to acquire subject vehicle information. Then a series of subject vehicle images 702, 704, 706,and 708 with different levels of induced damage are provided as part of the graphical user interface 700. The images 702, 704, 706,and 708 of the subject vehicles may be of subject vehicles which are similar to the subject vehicle in the subject accident. The user selects the vehicle image in the graphical user interface having damage most like the subject vehicle damage. Based on the selection of subject vehicle image selected, the ΔV data acquisition module 214 assigns a crush depth profile to that subject vehicle across the appropriate width. The appropriate width is based on the severity of damage incurred as provided by the user to ΔV determination module 200. For example, if a fender well is damaged, ΔV data acquisition module 214 may assign a bumper crush width of one-half, and if only the area of the fender adjacent to the bumper is damaged, ΔV data acquisition module 214 may assign a bumper crush width of one-quarter. Actual crush widths may be determined, for example, empirically to obtain an accurate ΔV for each subject vehicle.

In addition to or as an alternative to the interactive displays described herein, information regarding the damaged components on one or more vehicles may be entered in a data file that is later read by computer instructions for use in estimating ΔV. A voice recognition system may also be used for data entry. Further, sensor systems may be used to provide information to the data acquisition module 214 regarding damage to components of a vehicle. Such sensor systems may utilize one or more of a variety of sensing technologies and would provide relatively accurate information regarding the severity of the damage. For example, a sensor system provides a map of damage depth versus location that is used to analyze force and direction of impact. Sensor systems also provide information regarding damage to components that are hidden from view. Severity of damage may also be determined by using computerized imagery from one or more photographs and/or sensor system images of the vehicle damage. Information regarding the location and line of sight of the camera and/or sensor system, and the location and orientation of the vehicle with respect to a reference is provided. Crush profiles are generated by the computer utilizing trigonometric calculations and/or image recognition/comparison techniques.

Computational Estimation of ΔV Based on Subject Vehicle Crush Depth or Induced Damage A ΔV determination module based on subject vehicle crush depth or induced damage ("ΔV crush determination module") 216 determines the amount of energy required to produce the damage acquired by ΔV data acquisition module 214. If there is no crush in a subject vehicle, the ΔV crush determination module 216 will estimate a "crush threshold" energy, i.e. the amount of energy required to produce crush. If neither subject vehicle has crush, then the ΔV crush determination module 216 will generate a crush threshold energy analysis for both subject vehicles in a collision in accordance with equation 000:

$$E = \frac{A^2}{2B} W_C. \qquad [000]$$

where, E is the crush threshold energy, $W_C$, is the subject vehicle bumper width, A and B are empirically determined stiffness coefficients.

The lowest energy, E, determined by ΔV crush determination module 216 with equation 000 is chosen as an upper bound for the energy of the other subject vehicle, since the subject vehicle with the lowest crush threshold energy was not damaged. $W_C$ of the vehicle with the larger energy is reduced until an energy balance is achieved. ΔV's for the respective subject vehicles are then estimated by determining BEV from equation 10 and ΔV is estimated from equation 5 from BEV.

If there is crush damage on a subject vehicle, then the ΔV crush determination module 216 will calculate the required crush energy. If the crush energies between the subject vehicles are approximately the same, for example, within 2.5%, then they are considered to be balanced. If they are not approximately the same, then the ΔV crush determination module 216 will first initiate internal adjustments to adjust stiffness, crush width, and crush stiffness parameters to approximately balance the energies to within, for example, 2.5%.

As described in more detail below, the ΔV crush determination module 216 enables the estimation of crush energy, computation of BEV's, and, ultimately, estimated ΔV's of subject vehicles from estimates of residual subject vehicle crush deformation and subject vehicle characteristics supplied by ΔV data acquisition module 214.

Conventionally, observations have demonstrated that for low-speed barrier collisions residual subject vehicle crush is proportional to impact speed. Campbell modeled subject vehicle stiffness as a linear volumetric spring which accounted for both the energy required to initiate crush and the energy required to permanently deform the subject vehicle after the crush threshold had been exceeded. Campbell's model relates residual crush width and depth (and indirectly crush height) to force per unit width through the use of empirically determined "stiffness coefficients." The Campbell method provides for non-uniform crush depth over any width and allows scaling for non-uniform vertical crush.

BEV's can be calculated for each subject vehicle separately using the crush dimension estimates from ΔV data acquisition module 214 and subject vehicle stiffness factors for the damaged area. However, a BEV is not the actual ΔV experienced at the passenger compartment in a barrier collision. Nor are BEV's calculated from crush energy estimates appropriate measures of ΔV's in two-car collisions. In order to employ BEV estimates for calculating ΔV estimates the subject vehicles should approximately achieve a common velocity just prior to their separation. Further, the degree of elasticity of the collision should be known or accurately estimated to achieve reasonably good estimates of actual ΔV's in either barrier or subject vehicle-to-subject vehicle collisions. Conservation of energy and momentum apply to all collisions.

The usual mathematical statement for the conservation of linear momentum is again given by equation 1 which is restated as:

$$m_1v_1+m_2v_2=m_1v'_1+m_2v'_2+F\Delta t. \qquad [1]$$

where m is mass, v is a pre-impact velocity vector, v' is a post-impact velocity vector, and the subscripts 1 and 2 refer to the two subject vehicles, respectively. The FΔt term is a vector and accounts for external forces, such as tire forces, acting on the system during the collision. If the subject vehicles are considered a closed system, that is, they exchange energy and momentum only between each other, then the FΔt term can be dropped. It should be noted that, in very low-speed collisions, tire forces may become important. For example, if braking is present, it may be necessary to account for the momentum dissipated by impulsive forces at the subject vehicles' wheels.

For the two-car system, the conservation of energy yields, $$½m_1v_1^2+½m_2v_2^2=½m_1v'^2_1+½m_2v'^2_2+E_{C_1}+E_{C_2}. \qquad [2]$$

where the $E_{C1}$ and $E_{C2}$ are vectors and represent the crush energies absorbed by subject vehicles 1 and 2 respectively. Finally, the coefficient of restitution, e, for the collision is defined by, $$(v'_2-v'_1)_{PDOF}=e(v'_2-v'_1)_{PDOF}. \qquad [3]$$

The "PDOF" subscript serves as a reminder that the coefficient of restitution, e, is a scalar quantity, defined only in the direction parallel to the collision impulse (shared by the subject vehicles during their contact), i.e. in the direction of the PDOF and normal to the plane of interaction between the subject vehicles. For central collinear collisions, the restorative force produced by restitution is in the same direction as v and v'. For oblique and non-central collisions, the determination of the direction in which restorative forces act may be much more complicated. Also note that for a purely elastic collision kinetic energy is conserved and both $E_{C2}$, and $E_{C2}$ are zero.

The BEV's for the subject vehicles are defined by, $$E_{C_i}=½m_iBEV_i^2, i=1,2 \qquad [4]$$

where the subscripts i refer to the individual subject vehicles. Thus, from BEV for a particular subject vehicle, the crush energy for that subject vehicle can be estimated. The definition of BEV in equation 4 assumes that the restitution for the barrier collision is 0. In any actual barrier collision, the BEV is related to the Δv by, $$\Delta v = \frac{(1+e)}{\sqrt{1-e^2}}BEV. \qquad [5]$$

Note that Δv is a scalar for a perpendicular, full-width barrier collision.

Combining equations 1, 2, and 3, neglecting FΔt, and letting, $E=E_{C1}+E_{C2}$:

$$\Delta v = \frac{(1+e)}{1+\frac{m_i}{m_2}}\sqrt{\frac{2E(m_1+m_2)}{(1-e^2)m_1m_2}}, . \qquad [6]$$

where, $\Delta v_2=v'_{2-v2}$.

To estimate the crush energy absorbed by each subject vehicle and the coefficient of restitution for the collision, Campbell's method, as modified by McHenry, may be used when no test subject vehicle collisions data is available; see McHenry, R. R., *Mathematical Reconstruction of Highway Accidents*, DOT HS 801–405, Calspan Document No. ZQ-5341-V-2, Washington, D.C., 1975; and McHenry, R. R. and McHenry, B. G., *A Revised Damage Analysis Procedure for the CRASH Computer Program*, presented at the Thirtieth STAPP Car Crash Conference, Warrendale, Pa., Society of Automotive Engineers, 1986, 333–355, SAE Paper.

The deformation energy estimator 218 generally estimates deformation energy is based on a "one-way spring" model for subject vehicle stiffness because the residual crush observed after barrier collisions is approximately proportional to closing velocity. This model is valid for modeling subject vehicle crush stiffness in barrier collisions at low to moderate values of velocity change. The mathematical statement of the most useful form of the correlation is given by $$\sqrt{\frac{2E}{W_c}} = \sqrt{B}\,C+\frac{A}{\sqrt{B}}. \qquad [7]$$

where, E is deformation energy, $W_C$, is the sum of the crush widths in all selected grids, A and B are empirically determined stiffness coefficients which relate the force required per unit width of crush to crush depth for a full height, uniform vertical crush profile. The parameter C is the root mean square value of the user selected crush depths in the actual horizontal crush profile. Note again that even when there is no residual crush, equation 7 yields a deformation energy value equal to $$E = \frac{A^2}{2B} W_C. \quad [8]$$

Caution should be employed when using the "zero deformation" energy value as it is sometimes based on assumption of a "no damage" or "damage threshold" ΔV. The A and B stiffness coefficient values are calculated in a well-known manner from linear curve fits of energy versus crush depth measured in staged barrier impact tests. A and B values are estimated using NHTSA, IIHS and/or Consumer Reports crash tests for vehicles that have been tested by these organizations. A and B values are also available from data in Siddall and Day, Updating the Vehicle Class Categories, #960897, Society of Automotive Engineers, Warrendale, Pa., 1996 ("Siddall and Day"). However, ΔV crush determination module 216 assigns relatively low confidence to "no damage" ΔV estimates calculated from crush energy. Standard deviations for the stiffness coefficients can be used to estimate the degree of variation in the parameters within a particular class. Siddall and Day also provide standard deviations for estimating variation. This data is employed by ΔV crush determination module 216 to estimate confidence intervals for the energy and ΔV estimates calculated for a particular subject vehicle when using the stiffness data for its size class.

The ΔV crush determination module 216 performs a sensitivity analysis for estimates of BEV. Estimates of crush energy may be calculated from:

$$\sqrt{\frac{2E}{W_c}} = \sqrt{B}\,C + \frac{A}{\sqrt{B}}. \quad [9]$$

Also, the BEV is defined by:

$$E = \tfrac{1}{2} m\, BEV^2 \quad [10]$$

Combining 9 and 10 yields:

$$BEV = \left(C + \frac{A}{B}\right)\sqrt{\frac{W_C B}{m}}. \quad [11]$$

Using the following formula from the Calculus:

$$df(x_i),\ i = 1, \ldots, n = \sum_n \frac{\partial f}{\partial x_i} dx_i;\ i = 1, \ldots, n \quad [12]$$

where the partial derivatives with respect to a particular parameter are known as the "sensitivities" of the function f to the variables, $x_i$;

$$dBEV = \sum \frac{\partial BEV}{\partial x_i} dx_i;\ \text{where } x_i = C, A, B, W_C, m. \quad [13]$$

The sensitivities to the variables are:

$$\frac{\partial BEV}{\partial C} = \sqrt{\frac{BW_C}{m}}, \quad [14]$$

$$\frac{\partial BEV}{\partial A} = \sqrt{\frac{W_C}{Bm}}, \quad [15]$$

$$\frac{\partial BEV}{\partial B} = \frac{\left(C - \frac{A}{B}\right)}{2}\sqrt{\frac{W_C}{Bm}}, \quad [16]$$

$$\frac{\partial BEV}{\partial W_C} = \frac{\left(C + \frac{A}{B}\right)}{2}\sqrt{\frac{B}{W_C m}}, \quad [17]$$

and, finally, $$\frac{\partial BEV}{\partial m} = \frac{\left(C + \frac{A}{B}\right)}{2m}\sqrt{\frac{BW_C}{m}}. \quad [18]$$

Then, given that BEV and m are positive definite, equation 13 is used to calculate the error in the BEV estimate given the errors in the individual parameters and their sensitivities. Now, returning to equation 10, and applying equation 12, the standard error for the crush energy is expressed in terms of the BEV, mass, and their standard errors. So that:

$$dE = \tfrac{1}{2} BEV^2 dm + mBEV dBEV. \quad [19]$$

It is preferable to employ crush stiffness for specific vehicle model and make if such data exist. As discussed above, subject vehicle-specific crush stiffness data is utilized by ΔV crush determination module 216.

Additionally, crush depth and $\sqrt{2 E_c/W_c}$ are generally linearly related for full-width crush up to a depth of approximately 10 to 12 inches. Linear crush versus $\sqrt{2 E_c/W_c}$ plots for the front and rear of several hundred passenger subject vehicles, light trucks, and multipurpose subject vehicles are available from Prasad to determine crush stiffness for vehicles supported by the data; see Prasad, A. K., Energy Absorbing Properties of Vehicle Structures and Their Use in Estimating Impact Severity in Automobile Collisions, 925209 Society of Automotive Engineers, Warrendale, Pa., 1990.

Subject vehicles involved in actual collisions frequently do not align perfectly. That is, either the bumper heights of the vehicles may not align (override/underride) or the subject vehicles may not align along the subject vehicle widths (offset) or both conditions may exist. In addition, the subject vehicles may collide at an angle or the point of impact may be a protruding attachment on one of the subject vehicles.

IIHS crash tests are full width barrier impacts. Damage above the bumper in the crash tests is generally a result of the bumper protection limits having been exceeded. In an offset situation, the full width of the bumper is not absorbing the impact like the barrier test. The amount of offset is directly related to the usefulness of a full width barrier impact crash test in the assignment of ΔV.

Offset also affects the ΔV estimate calculated by ΔV crush determination module 216. When the subject vehicles do not align and there is some offset, the area of contact is reduced for one or both subject vehicles. One of the subject vehicle parameters in ΔV crush determination module 216 is the crush width, $W_C$, so any offset should be accounted in the calculation of the ΔV by, for example, incrementally reducing the crush width in accordance with user input data indicating an offset amount.

The user interface may allow a non-technical person to enter an assessment of the likelihood of offset by, for example, reviewing photographs of the subject vehicles involved and determining patterns of damage which would be consistent with observations of the subject vehicle damage. An offset situation generally includes the following characteristics: First, in a front-to-rear collision, the subject vehicles should be damaged on opposite sides of the front and rear of the subject vehicles. For example, the left front of the subject vehicle with the frontal collision should be damaged and the right rear of the subject vehicle with the rear collision should be damaged. Second, information about the subject vehicle motion prior to impact can be helpful in determining offset. For example, changing lanes prior to impact or swerving to avoid impact when combined with the visual damage outlined above may suggest offset was present. In the absence of any information indicating an offset accident, a full width impact may be inferred as a conservative estimate.

Additionally, alternative assessments of subject vehicle offset and use of ΔV's based on crash test information may include assuming that full width contact without regard to the actual impact configuration, the actual or estimated contact width could be estimated and used in the ΔV crush determination module 216 calculations, use crash test based ΔV determinations on all cases assuming full width contact occurred, or use crash test based ΔV determinations as long as the full width contact is a reasonable estimation for the amount of offset in the accident.

When generating conservative ΔV estimates, the ΔV determination module 200 preferably does not use the crash test comparison unless the amount of overlap between the subject vehicles is 66% or greater.

The principal forces estimator 220 utilizes Newton's third Law of Motion before summing crush energies to calculate the total collision energy. According to Newton's third Law of Motion, a collision impulse, shared by two subject vehicles during a collision, must apply equal and opposite forces to the subject vehicles. The force associated with crush damage to a subject vehicle is calculated from:

$$F=W_c(A+B\cdot C). \qquad [20]$$

Figure 10:
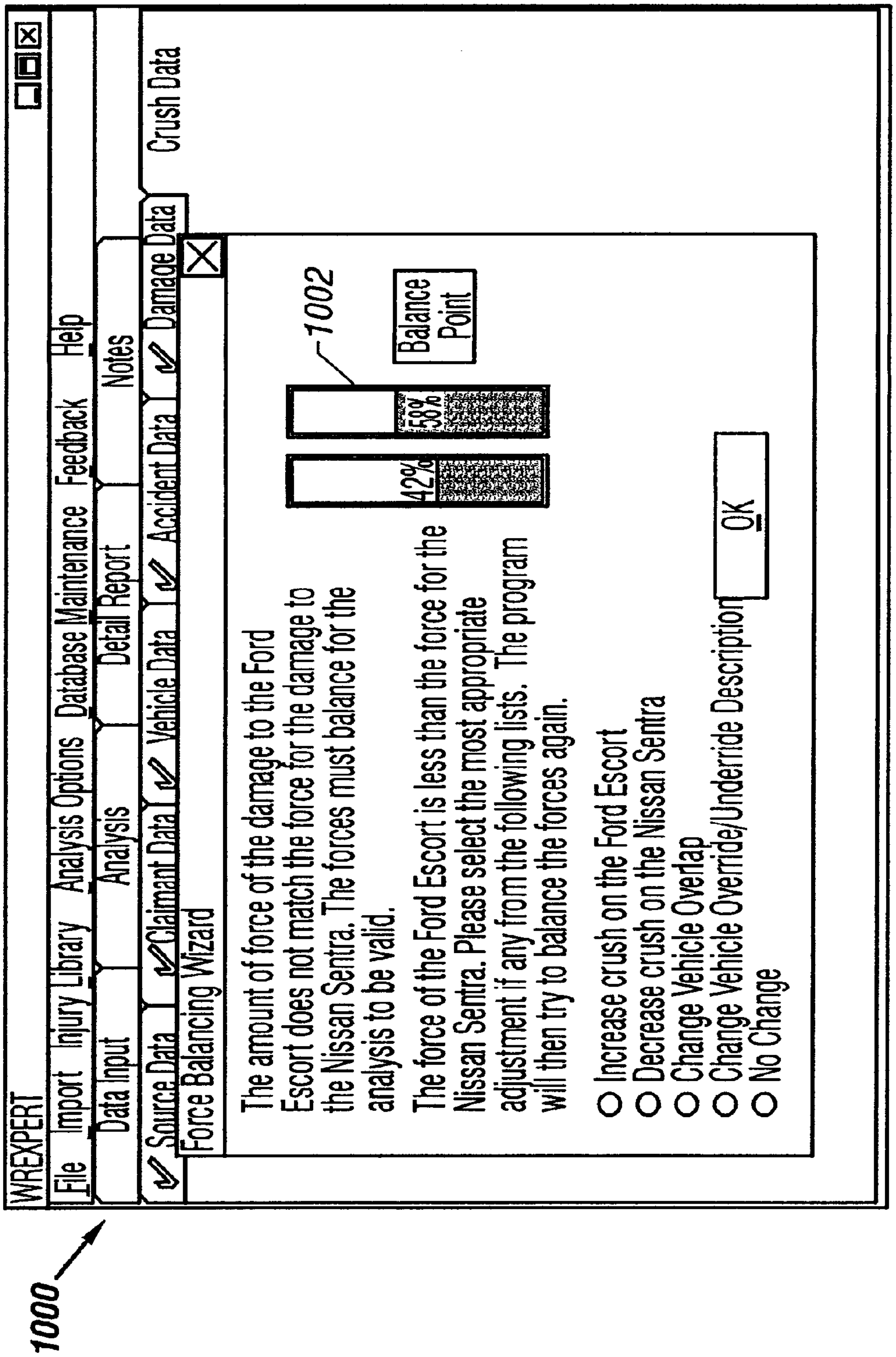

Before summing individual vehicle crush energies, F is calculated for each subject vehicle and compared. If they are not approximately equal, the damage is reexamined and adjustments are made to bring the forces to equality within some specified range. The force associated with crush damage to a vehicle is easily calculated from equation 20, where, F is the magnitude of the principal force, A and B are the stiffness parameters for the vehicle in question and C is the effective crush depth. Principal forces estimator 220 estimates principal forces independently from equation 20 for each subject vehicle and averages the forces. If the individual forces are not approximately the same, for example, within 2.5% of their average value, then the A and B subject vehicle stiffness parameters are adjusted in 1% increments in the appropriate direction until the forces balance within, for example, 2.5% or until the adjustment exceeds one standard deviation of either of the A values of the subject vehicle. If more than one standard deviation of adjustment is required to balance the forces, an additional adjustment is made of crush width and/or depth (within narrow limits) using the adjusted stiffness parameters until balance to within, for example, 2.5% is achieved or the adjustment limits are equaled. If balance still is not achieved, the user is advised that the forces do not balance and "manual" adjustments to subject vehicle crash data are necessary, if appropriate, to bring the forces into balance. A list of potential changes together with appropriate direction of change is generated for presentation to the user in a user interface generator 206 provided graphical user interface, an example of which is shown in FIG. 10, to assist the balancing process. After the forces are balanced, the EC's are summed to compute total crush energy from which ΔV's are computed.

Referring to FIG. 10, a graphical user interface 1000 is produced by user interface generator 206 to provide screen objects and selectable input information fields to allow a user to manually adjust subject vehicle parameters to achieve approximate force balance. The graphical user interface 1000 also provides a dynamic visual indicator 1002 of resulting force balance between the two subject vehicles involved in a collision.

When there is no damage to either subject vehicle, the ΔV's are calculated using the lower of the two principal forces and using a crush depth of zero. The contact width of the subject vehicle with the larger force is reduced until force balance is achieved after which crush energy and ΔV's are estimated in the same manner as for vehicles with residual crush.

Coefficient of restitution estimator 222 estimates a subject vehicle-to-subject vehicle coefficient of restitution, e. In higher-energy collisions, collision elasticity is usually assumed to be negligible. However, in low-energy collisions, restitution can be quite high and should be considered in the estimation of collision-related velocity changes. Collision elasticity (restitution) is nonlinearly, inversely related to closing speed in two-subject vehicle collisions. It is known that:

$$e=\sqrt{1+\frac{m_1(e_2^2-1)+m_2(e_1^2-1)}{m_1+m_2}} \qquad [21]$$

Thus, if barrier-determined coefficients of restitution are available, then equation 21 can be employed to estimate the subject vehicle-to-subject vehicle coefficient of restitution, e. There is a restriction on the use of equation 21 that requires that the barrier impact speeds for the test subject vehicles must be approximately equal to the differences between the individual subject vehicle velocities and the system center of mass velocity for the two-subject vehicle collision. The velocity of the system center of mass, $v_{cm}$, is given by $$v_{cm}=\frac{m_1v_1+m_2v_2}{m_1+m_2}. \qquad [22]$$

Figure 9:
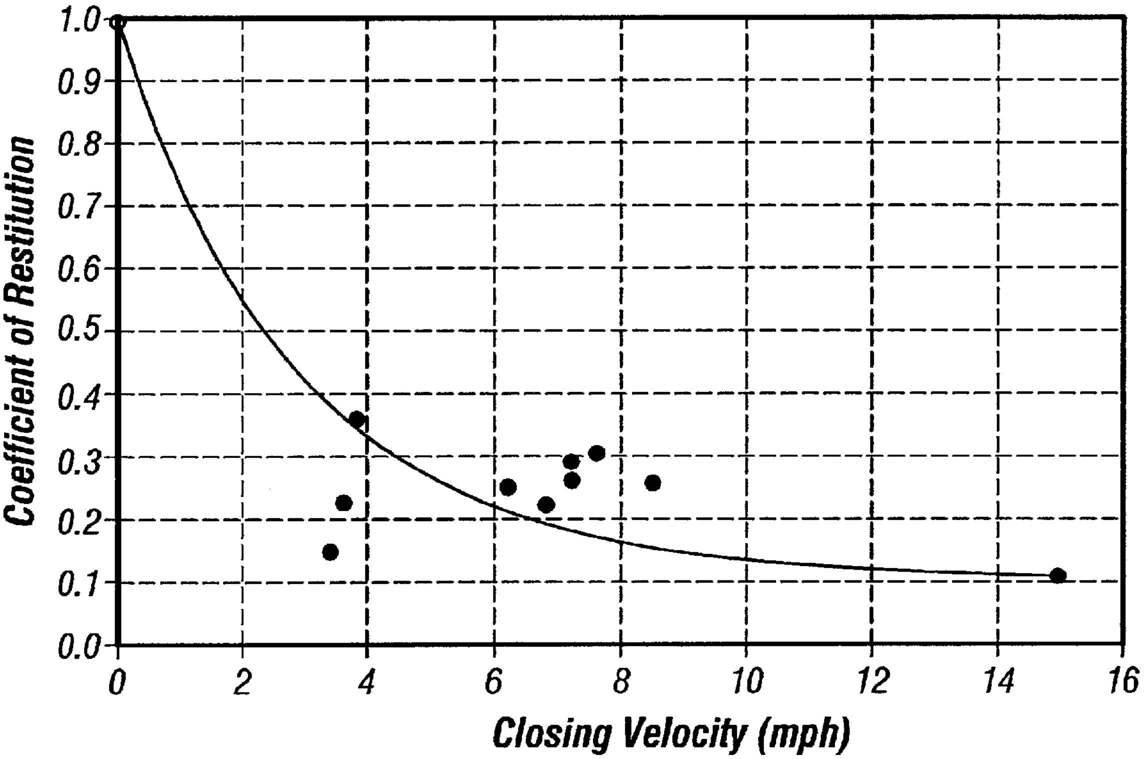
FIG. 9 is a coefficient of restitution versus closing velocity plot.

Referring to FIG. 9, in ΔV crush determination module 216, an estimate of the coefficient of restitution is generated using an iterative scheme which employs an empirical curve fit of restitution to closing velocity.

Using low-speed crash test data published by Howard, et al, an empirical relationship between the coefficient of restitution and closing velocity was derived. It was assumed that the coefficient of restitution has a lower limiting value of α, where α is, for example, 0.1 for closing velocities greater than or equal to 15 mph. In addition, the coefficient of restitution has a value of 1.0 when the closing velocity is zero. This gave the empirical relationship the form, $$e=\alpha+(1-\alpha)exp^{\tau V_c} \qquad [23]$$

where: $V_c$ is the closing velocity in mph, and

τ and α are determined from a curve fit of restitution vs. $V_c$.

Using Howard's data to solve for the coefficient T in a least-squares sense yields, $$e=0.1+0.9exp^{(-0.34V)}C \quad [24]$$

where α is assumed to be 0.1 and τ is determined from a curve fit of coefficient of restitution versus $V_c$, such as shown in FIG. 9.

Solving equation 24 for the closing velocity gives, $$V_C = \frac{\ln\left(\frac{0.9}{e-0.1}\right)}{\tau} \quad [25]$$

The following relationship exists between the energy dissipated by vehicle damage and the available pre-impact kinetic energy, $$E_C = E_{C_1} + E_{C_1} = \frac{(1-e^2)}{2}\left(\frac{m_1 m_2}{m_1 + m_2}\right)V_C^2 \quad [26]$$

Substituting equation 25 into equation 26 gives $$E_C = (1-e^2)\left(\frac{m_1 m_2}{m_1 + m_2}\right)\frac{\ln\left(\frac{0.9}{e-0.1}\right)}{\tau^2} \quad [27]$$

Given an estimate of the damage energy, $E_C$, the value of e can be determined numerically. Using a function of the form, $$f(e) = (1-e^2)\left(\frac{m_1 m_2}{m_1 + m_2}\right)\ln\frac{\left(\frac{0.9}{e-0.1}\right)}{\tau^2} - E_C, \quad [28]$$

the value for e can be found using a simple root-finding algorithm, e.g. bisection method, secant method, Newton-Raphson, etc.

The closing and separation velocities of subject vehicles are virtually never available a priori for use in determining either ΔV or the deformation energy. Thus, the subject vehicle relative closing velocity estimator 224 utilizes the methods described above to estimate deformation energy. Given an estimate of E and e, the following relationship is employed to estimate closing velocity.

$$E_C = E_{C_1} + E_{C_1} = \frac{(1-e^2)}{2}\left(\frac{m_1 m_2}{m_1 + m_2}\right)(v_1 - v_2)^2 \quad [29]$$

Or, in other words, $$\frac{\text{Energy Used for Crush}}{\text{Energy Available for Crush}} = (1-e^2) \quad [30]$$

Alternatively, after $\Delta v_2$ has been estimated from crush energy and restitution estimates, the relative approach velocity can be estimated from:

$$\Delta v_2 = \frac{(1+e)}{1+\frac{m_2}{m_1}}(v_1 - v_2) \quad [31]$$

Thus, if either of the respective pre-collision velocities of the subject vehicles is known, the other pre-collision velocity can be calculated.

As stated above, the A and B parameters employed in equation 7 were developed from high energy barrier collisions at closing velocities of 15 to 30 miles per hour. For low speeds, crash tests may be used to determine the A values. Low speed A values may also be derived by assuming that the "no damage" ΔV is 4 or 5 miles per hour. Alternatively, "no damage" ΔV's of greater than 10 may be used. Regardless of which method is used, confidence in the accuracy of stiffness factors is low because of unknown precision in the crash-test methods used to develop them. Additionally, as already noted, collision restitution is difficult to determine, short of direct measurement. Moreover, crush dimension estimates, especially when made from photographs, often are little more than guesses, and even subject vehicle weight may not be known accurately because of unknown weights of passengers and payload.

Thus the ΔV estimate determination error operation 226 characterizes the error in the ΔV calculations in order to obtain a distribution of ΔV's. The values of the subject vehicle weights, stiffness factors A and B, crush widths, crush depths, and a coefficient of restitution, e, parameters employed in ΔV crush determination module 216 are all likely to be in error to some degree. The essence of the problem of estimating error in ΔV calculations is, thus, related to estimating the error in the individual parameters and the propagation of that error through the mathematical manipulations required to calculate ΔV. Estimates of the error in individual parameters are available for the stiffness parameters. However, estimates of error for the other parameters are not available in the literature except for the stiffness parameter standard deviations supplied by Siddal and Day pp. 271–280 and particularly page 276.

The ΔV crush determination module 216 runs numerous sets of trials, such as 10,000 trials, for example, with combinations of the parameters for each subject vehicle. For each trial a crush force is determined using equation 20. After determining the parameter combinations that enable a balancing of forces which still enable an approximate force balance between the subject vehicles, statistics are run on the using the parameter combinations to determine a distribution of ΔV and an expected value for the ΔV. The ΔV determination error operation 226 returns these values to ΔV determination module 200 as the results of the ΔV crush determination module 216.

The parameters are varied in accordance with Table 7.

TABLE 7

| Subject Vehicle Parameter | Variation |
|---|---|
| Subject vehicle weight | nominal +/− 5% |
| Stiffness factor, A | nominal +/− 2 standard deviations (std) for subject vehicle class |
| Stiffness factor, B | nominal +/− 2 standard deviations (std) for subject vehicle class |
| Crush width, $W_C$ | nominal +/− (1/16) subject vehicle width (not to exceed subject vehicle width) |

TABLE 7-continued

| Subject Vehicle Parameter | Variation |
|---|---|
| Crush depth, C | nominal +/− 0.5 inch. (minimum = zero) |
| coefficient of restitution, e (applied to both subject vehicles) | nominal +/− 0.2 (minimum = 0, maximum = 1) |

Using the combination of parameters in Table 7 that result in a force balance between the subject vehicles of +/−2.5%, a distribution of ΔV's for each subject vehicle is determined by ΔV crush determination module 216 as discussed below.

The change in velocity of vehicle 2 ($\Delta v_2$) in a two-car, vehicle-to-vehicle collision may be written as:

$$\Delta v_2 = \frac{m_2(1+e)}{m_1+m_2}\sqrt{\frac{2(m_1+m_2)}{(1-e^2)m_1m_2}}\sqrt{E}. \quad [32]$$

Where, $E=E_{C1}+E_{C2}$, and $\Delta v_1$ is calculated by conservation of momentum, i.e.

$$m_1\cdot\Delta v_1=m_2\cdot\Delta v_2 \quad [33]$$

Rewriting equation 33 as:

$$\Delta v_2=f_1 f_2 f_3. \quad [34]$$

Where, $$f_1 = \frac{m_2(1+e)}{m_1+m_2}, \quad [35]$$

$$f_2 = \sqrt{\frac{2(m_1+m_2)}{(1-e^2)m_1m_2}}, \quad [36]$$

and, $$f_3 = \sqrt{E} = \sqrt{\frac{1}{2}B_1W_1\left(C_1+\frac{A_1}{B_1}\right)^2+\frac{1}{2}B_2W_2\left(C_2+\frac{A_2}{B_2}\right)^2}. \quad [37]$$

Then applying the following formula from the Calculus, $$df(x_i),\ i=1,\ \ldots,\ n=\sum_n \frac{\partial f}{\partial x_i}dx_i;\ i=1,\ \ldots,\ n \quad [38]$$

where the partial derivatives with respect to a particular parameter are known as the "sensitivities" of the function $f$ to the variables, $x_i$. Using equation 38:

$$d\Delta v_2 = \sum\frac{\partial\Delta v_2}{\partial x_i}dx_i;\ \text{where } x_i = C_j,\ A_j,\ B_j,\ W_j,\ C_j,\ m_j,\ e\cdot[j=1,2]. \quad [39]$$

Then, using equation 34 and, $$d\Delta v_2=f_2f_3\,df_1+f_1f_3\,df_2+f_1f_2\,df_3. \quad [40]$$

Where, applying equation 38 to equation 40 and simplifying yields, for j=1, 2, $$\frac{\partial\Delta v_2}{\partial A_j} = \frac{m_2(1+e)}{m_1+m_2}\sqrt{\frac{2(m_1+m_2)}{(1-e^2)Em_1m_2}}\frac{W_j}{2}\left(C_j+\frac{A_j}{B_j}\right), \quad [41]$$

$$\frac{\partial\Delta v_2}{\partial B_j} = \frac{1}{2}\frac{m_2(1+e)}{m_1+m_2}\sqrt{\frac{2(m_1+m_2)}{(1-e^2)Em_1m_2}}\left[\frac{Wj}{2}\left(C_j+\frac{A_j}{B_j}\right)^2-\frac{W_jA_j}{B_j}\left(C_j+\frac{A_j}{B_j}\right)\right], \quad [42]$$

$$\frac{\partial\Delta v_2}{\partial C_j} = \frac{m_2(1+e)}{m_1+m_2}\sqrt{\frac{2(m_1+m_2)}{(1-e^2)Em_1m_2}}\frac{B_jW_j}{2}\left(C_j+\frac{A_j}{B_j}\right), \quad [43]$$

$$\frac{\partial\Delta v_2}{\partial W_j} = \frac{m_2(1+e)}{m_1+m_2}\sqrt{\frac{2(m_1+m_2)}{(1-e^2)Em_1m_2}}\frac{B_j}{4}\left(C_j+\frac{A_j}{B_j}\right)^2, \quad [44]$$

$$\frac{\partial\Delta v_2}{\partial m_j} = -\frac{1}{2}\frac{m_2(1+e)}{m_1+m_2}\sqrt{\frac{2E(m_1+m_2)}{(1-e^2)Em_1m_2}}\left[\frac{1}{m_1m_2}+(-1)^{j-1}\frac{1}{m_j}\right], \quad [45]$$

and, $$\frac{\partial\Delta v_2}{\partial e} = \frac{m_2(1+e)}{m_1+m_2}\sqrt{\frac{2E(m_1+m_2)}{(1-e^2)m_1m_2}}\left[\frac{e}{1-e^2}+\frac{1}{1+e}\right] \quad [46]$$

If the errors in the subject vehicle parameters are independent and randomly distributed then the total error in $\Delta V_2$ is equal to:

$$d\Delta v_2 = \sqrt{\sum\left(\frac{\partial\Delta v_2}{\partial x_i}dx_i\right)^2} \quad [49]$$

where $x_i = C_j,\ A_j,\ B_j,\ W_j,\ C_j,\ m_j,\ e\cdot[j=1,2]$.

If the errors are drawn from a symmetrical distribution, such as the Normal Distribution, then $\Delta v_2$ lies between $\Delta v_2$+/−$d\Delta v_2$ with some known probability which is dependent on the distribution of $d\Delta v_2$. For random, symmetrically distributed errors, the total error is less than or equal to:

$$\sum\left|\frac{\partial v_2}{\partial x_i}\right|dx_i; \quad [48]$$

where $x_i = C_j,\ A_j,\ B_j,\ W_j,\ C_j,\ m_j,\ e\cdot[j=1,2]$.

If, however, the distribution of $d\Delta v_2$ is not symmetric, then the shape of the distribution must be known or estimated in order to assign an error range to $\Delta v_2$. In ΔV crush determination module 216, the Monte Carlo stochastic simulation technique is preferably employed to estimate the shape of the $d\Delta v_2$ distribution from estimated errors in the individual subject vehicle parameters. The distribution of $d\Delta v_2$ is in general not symmetrical because the scalar value of $\Delta v_2$ is always greater than zero, so that as $\Delta v_2$ approaches zero the error distribution becomes asymmetric. The resulting distribution of ΔV's for each subject vehicle is ΔV+/−$d\Delta v_2$.

Override/underride situations have implications for both the crash test ΔV operation 210 and ΔV crush determination module 216 analyses. For the crash test ΔV operation 210, the existence of override/underride means at least one of the subject vehicles involved cannot be compared with its crash test. The crash tests are full width barrier impacts. Damage above the bumper in the crash tests is generally a result of the bumper protection limits having been exceeded. In an override/underride situation, one of the subject vehicles is not impacted at the bumper. Since the bumper was designed to protect the relatively soft structures above the bumper, override/underride generally causes more extensive damage above the bumper of one of the subject vehicles.

For the ΔV crush determination module 216, the existence of override/underride has implications for the subject vehicle stiffness which is one of the variables in the crush calculation. The structures above the bumper are less resistant to crush (i.e. less stiff) than the bumper. When a subject vehicle is struck above the bumper, The stiffness factors A and B are preferably reduced by, for example, 50% to reflect the lower stiffness value for that area of the subject vehicle.

Typically, an override/underride situation has the following characteristics: One of the subject vehicles would have damage primarily above the bumper, often at a significantly higher level relative to the other subject vehicle; and the other subject vehicle would have damage primarily to the bumper or structures below the bumper with little or no damage above the bumper; in the absence of information to determine if override/underride was present, bumper alignment should be assumed as a conservative estimate.

Determining if override/underride conditions existed in a subject accident improves the accuracy of the ΔV assessment by ΔV crush determination module 216 by utilizing more of the information available about the accident. In the absence of override/underride information, ΔV determination module 200 will preferably default to the assumption of full width and bumper-to-bumper contact.

Override/underride logic 228 allows the ΔV crush determination module 216 to infer from the damage patterns on both subject vehicles if there was an override/underride in the subject accident. The override/underride logic 228 infers from damage patterns entered by a user via a graphical user interface for both subject vehicles if there was an override/underride in the subject accident. In general, if there is significant damage to both bumpers of both subject vehicles, the override/underride logic 228 will infer no override/underride was present. If there is damage above the bumper on one subject vehicle but damage only to the bumper on the other subject vehicle, override/underride logic 228 will infer override/underride. If override/underride logic 228 can infer from the damage patterns to the subject vehicles, it will confirm the inference with the user via a selectable outcome inquiry via a graphical user interface. Depending on the users answer to the confirming inquiry, override/underride logic 228 will make the appropriate changes to the stiffness of the subject vehicle as discussed above. If override/underride logic 228 cannot infer the override/underride situation, override/underride logic 228 will query the user via the graphical user interface if override or underride was present in the subject accident and make the appropriate adjustments to the stiffness factors under the circumstances discussed above.

Based on the categorization of damages for both subject vehicles using the damage rating system of component-by-component damage evaluator 204, the override/underride (or lack thereof) can be inferred from the damage patterns. The possible combinations of damage patterns are provided in Table 9 below. Also, damage ratings of "3" for Zone "L" are not included since they represent damages to Zone "M" which are reflected in the "M" rating.

TABLE 9

| Damage Codes For | Damage Codes For Subject vehicle A | | | | | | | | |
|---|---|---|---|---|---|---|---|---|---|
| Subject vehicle B | 00 | 01 | 02 | 10 | 11 | 12 | 20 | 21 | 22 |
| 00 | IN | IN | IN | IY | IN | IN | IY | IN | IN |
| 01 | IN | IN | IN | IY | IN | IN | IY | IN | IN |
| 02 | IN | IN | IN | IY | IN | IN | IY | IN | IN |
| 10 | IY | IY | IY | A | A | A | A | A | A |
| 11 | IN | IN | IN | A | A | A | IY | A | A |
| 12 | IN | IN | IN | A | A | IN | IY | A | IN |
| 20 | IY | IY | IY | A | IY | IY | | IY | IY |
| 21 | IN | IN | IN | A | A | A | IY | | IN |
| 22 | IN | IN | IN | A | A | IN | IY | IN | IN |

Table 10 provides a key for Table 9.

TABLE 10

| | |
|---|---|
| 0X | Damage code is "0" for zone |
| X0 | Damage code is "0" for zone |
| IY | Override/underride can be inferred |
| IN | Absence of override/underride can be inferred |
| A | Ask if override/underride occurred |
| | Unusual case ask follow-up questions |

Referring to Tables 9 and 10, damage patterns in which one subject vehicle has damage (or no damage at all) to the bumper (00, 01, 02, 11, 12, 21, 22) while the second subject vehicle has damage above the bumper (10, 20) are designated "IY" meaning override/underride was present. For example, consider a situation where Subject vehicle A was rear-ended by Subject vehicle B. Suppose a damage rating of "10" for Subject vehicle B was assigned which means that Zone "M" has a damage rating of 1 and Zone "L" has minor or no damage . This indicates cosmetic damage above the bumper and no or very slight damage to the bumper. Suppose also, a damage rating of "00" for Subject vehicle B was assigned. This means there was no damage above the bumper and very little or no damage to the bumper of Subject vehicle B. This would imply that Subject vehicle B overrode Subject vehicle A's bumper because Subject vehicle A has damage only above the bumper.

Damage patterns in which both subject vehicles have no damage or damage only to the bumpers are designated as "IN" meaning no override/underride was present. The damage codes combinations for which both subject vehicles have damage only to the bumper (00, 01, 02 for both subject vehicles) were inferred to have no override/underride since the damage was confined to the bumpers. In addition, when one or both of the subject vehicles has significant damage to the bumper and damage above the bumper (12, 21, 22) this would indicate a significant impact with that subject vehicle's bumper. These are also designated as "IN".

Situations in which one or both of the subject vehicles have minimal damage to the bumper but damage above the bumper (10, 11) and the other subject vehicle has some level of damage above the bumper, then the presence or absence of override/underride is not inferred by the override/underride logic 228 and are designated as "A" for ask a question to determine if override/underride was present.

The final situations are when both subject vehicles have significant damage above the bumper, but slight or no damage to the bumper (20 or 21 for both subject vehicles). These are unusual situations since it would be expected that the bumper should be damaged if the bumpers were impacted on both subject vehicles. It is highly improbable that both subject vehicles could experience an override/underride in the same accident by the definition of override/underride. Three possible exemplary explanations are:

First, one or both of the subject vehicles do not have a bumper (e.g. pickup. trucks without bumpers, a subject vehicle with its bumper removed). The override/underride logic 228 will ask if both subject vehicles had bumpers. If one or both subject vehicles did not have a bumper, the override/underride logic 228 will recommend further review outside of ΔV determination module 200.

Second, neither bumper exhibits any outward signs of damage even though the bumpers came in contact during the accident enough to damage structures above the bumper (e.g. foam core bumpers). The override/underride logic 228 will check bumper types to see if this was a possibility and will continue with the analysis.

Third, some information is missing or the accident did not occur in the manner described. The override/underride logic 228 will continue with the analysis but indicate that the damage pattern is unusual and unexplained by the information entered in the override/underride logic 228.

If the presence or absence of override/underride can be inferred, then the override/underride logic 228 will ask the user to confirm the inference. The override/underride logic 228 will ask the user to confirm by answering (1) Yes, the situation is as the override/underride logic 228 inferred, (2) No, based on the user's knowledge and information, the situation is not as the override/underride logic 228 inferred or (3) I, the user, do not know if the situation is as the override/underride logic 228 inferred.

Depending on the response by the user; the override/underride logic 228 will adjust subject vehicle stiffness values accordingly. Also, if one of the subject vehicles does not have a bumper impact, the override/underride logic 228 will not use the crash tests for that subject vehicle because the crash tests were conducted with a bumper impact. Table 11 gives the stiffness adjustments and/or crash test implications for each combination of inference and answer to the confirming question.

TABLE 11

| Inferred Situation | "Yes" Answer | "No" Answer | "I don't know" Answer |
|---|---|---|---|
| IY | 1. Subject vehicle which had bumper impact - Crash test used, 100% of subject vehicle stiffness.[1] 2. Subject vehicle with damage above bumper - Crash test not used, 50% of stiffness.[2] | 1. Use 100% stiffness and no crash tests for both subject vehicles.[3] | Same as "Yes" answer.[1,2] |
| IN | 1. Use 100% stiffness and crash tests for both subject vehicles[1] | 1. Use 100% stiffness and no crash tests for both subject vehicles.[3] | Same as "Yes" answer.[1] |

TABLE 11-continued

| Inferred Situation | "Yes" Answer | "No" Answer | "I don't know" Answer |
|---|---|---|---|
| A | Same as IY.[1,2] | Same as IN.[3] | Same as "No" answer.[3] |

Notes:
[1]Subject vehicle with bumper impact is representative of a barrier impact. Thus the crash tests are applicable. The bumper impact is also representative of the impact sustained in the barrier test and would involve the full stiffness of the subject vehicle.
[2]Subject vehicle with the override/underride does not involve the full subject vehicle stiffness because the soft structures above the bumper are taking the majority of the impact force. Thus, the barrier tests are not a good comparison in this scenario and the stiffness coefficients are significantly reduced by, for example, 50%, for use in ΔV crush determination module 216 to reflect the softness of the structures above the bumper.
[3]Assume at least partial bumper involvement and use the full stiffness. Since damage patterns indicate that at least partial override/underride occurred, the crash tests are not used.

In an alternative embodiment, the ΔV determination module 200 could, for example, make no adjustment to subject vehicle stiffnesses based on override/underride as a conservative estimate, make adjustments to subject vehicle stiffness based on reasonable assumptions with regard to the subject vehicle stiffness, use crash test comparisons on all cases assuming the bumper was involved in all accident situations, or use crash tests only when the bumper was involved and there is no evidence of override/underride.

The ΔV determination module 200 takes into account the ΔV determinations from both crash test ΔV operation 210 and ΔV the crush determination module 216 to develop a final estimate of the subject vehicle ΔV. The different ΔV determinations provide a range of general information. For example, if a subject vehicle sustained no damage in either an IIHS or CR crash test, this is an indication that the ΔV damage threshold for the subject vehicle is greater than 5 mph. This result does not provide any information about the value for the damage threshold and any comparison with a damaged subject vehicle gives very little information about the ΔV. If a subject vehicle sustained damage in a CR crash test but exhibits no damage as a result of a collision with another subject vehicle, the ΔV for the actual subject vehicle collision is very low.

The multi-method ΔV combination generator 232 generates the final ΔV 234 by combining the ΔV's of a subject vehicle determined by crash test ΔV operation 210, conservation of momentum operation 212 (when utilized as discussed above), and ΔV crush determination module 216 to determine a relatively more accurate subject vehicle ΔV.

Table 12 defines an exemplary set of rules for combining the IIHS crash test based ΔV, CR crash test based ΔV, and the subject vehicle crash test based rating.

TABLE 12

| Subject vehicle crash test based rating | CR | IIHS | IIHS-Subject vehicle crash test based rating | IIHS Applic-ability | CR-Subject vehicle crash test based rating | CR Applic-ability | Case is Suspect | CR Flag | IIHS Flag | dIIHS-dCR | CR Combo Weight | IIHS Combo Weight | CR Weight | IIHS Weight |
|---|---|---|---|---|---|---|---|---|---|---|---|---|---|---|
| 0 | 0 | 0 | 0 | 0 | 0 | 0 | 0 | 0 | 0 | 9 | 9 | 9 | 0 | 0 |
| 0 | 0 | 1 | 1 | 1 | 0 | 0 | 0 | 0 | 1 | 9 | 9 | 9 | 0 | 2 |
| 0 | 0 | 2 | 2 | 1 | 0 | 0 | 0 | 0 | 1 | 9 | 9 | 9 | 0 | 3 |

TABLE 12-continued

| Subject vehicle crash test based rating | CR | IIHS | IIHS-Subject vehicle crash test based rating | IIHS Applic-ability | CR-Subject vehicle crash test based rating | CR Applic-ability | Case is Suspect | CR Flag | IIHS Flag | dIIHS-dCR | CR Combo Weight | IIHS Combo Weight | CR Weight | IIHS Weight |
|---|---|---|---|---|---|---|---|---|---|---|---|---|---|---|
| 0 | 0 | 3 | 3 | 1 | 0 | 0 | 0 | 0 | 1 | 9 | 9 | 9 | 0 | 4 |
| 0 | 0 | 9 | 9 | 9 | 0 | 0 | 0 | 0 | 0 | 9 | 9 | 9 | 0 | 0 |
| 0 | 1 | 0 | 0 | 0 | 1 | 1 | 1 | 1 | 0 | 9 | 9 | 9 | 2 | 0 |
| 0 | 1 | 1 | 1 | 1 | 1 | 1 | 0 | 1 | 1 | 0 | 1 | 1 | 1 | 1 |
| 0 | 1 | 2 | 2 | 1 | 1 | 1 | 0 | 1 | 1 | 1 | 2 | 1 | 2 | 1 |
| 0 | 1 | 3 | 3 | 1 | 1 | 1 | 0 | 1 | 1 | 2 | 3 | 1 | 3 | 1 |
| 0 | 1 | 9 | 9 | 9 | 1 | 1 | 0 | 1 | 0 | 9 | 9 | 9 | 2 | 0 |
| 0 | 2 | 0 | 0 | 0 | 2 | 1 | 2 | 0 | 0 | 9 | 9 | 9 | 0 | 0 |
| 0 | 2 | 1 | 1 | 1 | 2 | 1 | 1 | 1 | 1 | −1 | 1 | 2 | 1 | 2 |
| 0 | 2 | 2 | 2 | 1 | 2 | 1 | 0 | 1 | 1 | 0 | 1 | 1 | 1 | 1 |
| 0 | 2 | 3 | 3 | 1 | 2 | 1 | 0 | 1 | 1 | 1 | 2 | 1 | 2 | 1 |
| 0 | 2 | 9 | 9 | 9 | 2 | 1 | 0 | 1 | 0 | 9 | 9 | 9 | 3 | 0 |
| 0 | 3 | 0 | 0 | 0 | 3 | 1 | 3 | 0 | 0 | 9 | 9 | 9 | 0 | 0 |
| 0 | 3 | 1 | 1 | 1 | 3 | 1 | 2 | 0 | 0 | 9 | 9 | 9 | 0 | 0 |
| 0 | 3 | 2 | 2 | 1 | 3 | 1 | 1 | 1 | 1 | −1 | 1 | 2 | 1 | 2 |
| 0 | 3 | 3 | 3 | 1 | 3 | 1 | 0 | 1 | 1 | 0 | 1 | 1 | 1 | 1 |
| 0 | 3 | 9 | 9 | 9 | 3 | 1 | 0 | 1 | 0 | 9 | 9 | 9 | 4 | 0 |
| 0 | 9 | 0 | 0 | 0 | 9 | 9 | 0 | 0 | 0 | 9 | 9 | 9 | 0 | 0 |
| 0 | 9 | 1 | 1 | 1 | 9 | 9 | 0 | 0 | 1 | 9 | 9 | 9 | 0 | 2 |
| 0 | 9 | 2 | 2 | 1 | 9 | 9 | 0 | 0 | 1 | 9 | 9 | 9 | 0 | 3 |
| 0 | 9 | 3 | 3 | 1 | 9 | 9 | 0 | 0 | 1 | 9 | 9 | 9 | 0 | 4 |
| 0 | 9 | 9 | 9 | 9 | 9 | 9 | 0 | 0 | 0 | 9 | 9 | 9 | 0 | 0 |
| 1 | 0 | 0 | −1 | 0 | −1 | 0 | 0 | 0 | 0 | 9 | 9 | 9 | 0 | 0 |
| 1 | 0 | 1 | 0 | 1 | −1 | 0 | 0 | 0 | 1 | 9 | 9 | 9 | 0 | 1 |
| 1 | 0 | 2 | 1 | 1 | −1 | 0 | 0 | 0 | 1 | 9 | 9 | 9 | 0 | 2 |
| 1 | 0 | 3 | 2 | 1 | −1 | 0 | 0 | 0 | 1 | 9 | 9 | 9 | 0 | 3 |
| 1 | 0 | 9 | 9 | 9 | −1 | 0 | 0 | 0 | 0 | 9 | 9 | 9 | 0 | 0 |
| 1 | 1 | 0 | −1 | 0 | 0 | 1 | 1 | 1 | 0 | 9 | 9 | 9 | 1 | 0 |
| 1 | 1 | 1 | 0 | 1 | 0 | 1 | 0 | 1 | 1 | 0 | 1 | 1 | 1 | 1 |
| 1 | 1 | 2 | 1 | 1 | 0 | 1 | 0 | 1 | 1 | 1 | 2 | 1 | 2 | 1 |
| 1 | 1 | 3 | 2 | 1 | 0 | 1 | 0 | 1 | 1 | 2 | 3 | 1 | 3 | 1 |
| 1 | 1 | 9 | 9 | 9 | 0 | 1 | 0 | 1 | 0 | 9 | 9 | 9 | 1 | 0 |
| 1 | 2 | 0 | −1 | 0 | 1 | 1 | 2 | 0 | 0 | 9 | 9 | 9 | 0 | 0 |
| 1 | 2 | 1 | 0 | 1 | 1 | 1 | 1 | 1 | 1 | −1 | 1 | 2 | 1 | 2 |
| 1 | 2 | 2 | 1 | 1 | 1 | 1 | 0 | 1 | 1 | 0 | 1 | 1 | 1 | 1 |
| 1 | 2 | 3 | 2 | 1 | 1 | 1 | 0 | 1 | 1 | 1 | 2 | 1 | 2 | 1 |
| 1 | 2 | 9 | 9 | 9 | 1 | 1 | 0 | 1 | 0 | 9 | 9 | 9 | 2 | 0 |
| 1 | 3 | 0 | −1 | 0 | 2 | 1 | 3 | 0 | 0 | 9 | 9 | 9 | 0 | 0 |
| 1 | 3 | 1 | 0 | 1 | 2 | 1 | 2 | 0 | 0 | 9 | 9 | 9 | 0 | 0 |
| 1 | 3 | 2 | 1 | 1 | 2 | 1 | 1 | 1 | 1 | −1 | 1 | 2 | 1 | 2 |
| 1 | 3 | 3 | 2 | 1 | 2 | 1 | 0 | 1 | 1 | 0 | 1 | 1 | 1 | 1 |
| 1 | 3 | 9 | 9 | 9 | 2 | 1 | 0 | 1 | 0 | 9 | 9 | 9 | 3 | 0 |
| 1 | 9 | 0 | −1 | 0 | 9 | 9 | 0 | 0 | 0 | 9 | 9 | 9 | 0 | 0 |
| 1 | 9 | 1 | 0 | 1 | 9 | 9 | 0 | 0 | 1 | 9 | 9 | 9 | 0 | 1 |
| 1 | 9 | 2 | 1 | 1 | 9 | 9 | 0 | 0 | 1 | 9 | 9 | 9 | 0 | 2 |
| 1 | 9 | 3 | 2 | 1 | 9 | 9 | 0 | 0 | 1 | 9 | 9 | 9 | 0 | 3 |
| 1 | 9 | 9 | 9 | 9 | 9 | 9 | 0 | 0 | 0 | 9 | 9 | 9 | 0 | 0 |
| 2 | 0 | 0 | −2 | 0 | −2 | 0 | 0 | 0 | 0 | 9 | 9 | 9 | 0 | 0 |
| 2 | 0 | 1 | −1 | 0 | −2 | 0 | 0 | 0 | 0 | 9 | 9 | 9 | 0 | 0 |
| 2 | 0 | 2 | 0 | 1 | −2 | 0 | 0 | 0 | 1 | 9 | 9 | 9 | 0 | 1 |
| 2 | 0 | 3 | 1 | 1 | −2 | 0 | 0 | 0 | 1 | 9 | 9 | 9 | 0 | 2 |
| 2 | 0 | 9 | 9 | 9 | −2 | 0 | 0 | 0 | 0 | 9 | 9 | 9 | 0 | 0 |
| 2 | 1 | 0 | −2 | 0 | −1 | 0 | 1 | 0 | 0 | 9 | 9 | 9 | 0 | 0 |
| 2 | 1 | 1 | −1 | 0 | −1 | 0 | 0 | 0 | 0 | 9 | 9 | 9 | 0 | 0 |
| 2 | 1 | 2 | 0 | 1 | −1 | 0 | 0 | 0 | 1 | 9 | 9 | 9 | 0 | 1 |
| 2 | 1 | 3 | 1 | 1 | −1 | 0 | 0 | 0 | 1 | 9 | 9 | 9 | 0 | 2 |
| 2 | 1 | 9 | 9 | 9 | −1 | 0 | 0 | 0 | 0 | 9 | 9 | 9 | 0 | 0 |
| 2 | 2 | 0 | −2 | 0 | 0 | 1 | 2 | 0 | 0 | 9 | 9 | 9 | 0 | 0 |
| 2 | 2 | 1 | −1 | 0 | 0 | 1 | 1 | 1 | 0 | 9 | 9 | 9 | 1 | 0 |
| 2 | 2 | 2 | 0 | 1 | 0 | 1 | 0 | 1 | 1 | 0 | 1 | 1 | 1 | 1 |
| 2 | 2 | 3 | 1 | 1 | 0 | 1 | 0 | 1 | 1 | 1 | 2 | 1 | 2 | 1 |
| 2 | 2 | 9 | 9 | 9 | 0 | 1 | 0 | 1 | 0 | 9 | 9 | 9 | 1 | 0 |
| 2 | 3 | 0 | −2 | 0 | 1 | 1 | 3 | 0 | 0 | 9 | 9 | 9 | 0 | 0 |
| 2 | 3 | 1 | −1 | 0 | 1 | 1 | 2 | 0 | 0 | 9 | 9 | 9 | 0 | 0 |
| 2 | 3 | 2 | 0 | 1 | 1 | 1 | 1 | 1 | 1 | −1 | 1 | 2 | 1 | 2 |
| 2 | 3 | 3 | 1 | 1 | 1 | 1 | 0 | 1 | 1 | 0 | 1 | 1 | 1 | 1 |
| 2 | 3 | 9 | 9 | 9 | 1 | 1 | 0 | 1 | 0 | 9 | 9 | 9 | 2 | 0 |
| 2 | 9 | 0 | −2 | 0 | 9 | 9 | 0 | 0 | 0 | 9 | 9 | 9 | 0 | 0 |
| 2 | 9 | 1 | −1 | 0 | 9 | 9 | 0 | 0 | 0 | 9 | 9 | 9 | 0 | 0 |
| 2 | 9 | 2 | 0 | 1 | 9 | 9 | 0 | 0 | 1 | 9 | 9 | 9 | 0 | 1 |
| 2 | 9 | 3 | 1 | 1 | 9 | 9 | 0 | 0 | 1 | 9 | 9 | 9 | 0 | 2 |

TABLE 12-continued

| Subject vehicle crash test based rating | CR | IIHS | IIHS-Subject vehicle crash test based rating | IIHS Applic-ability | CR-Subject vehicle crash test based rating | CR Applic-ability | Case is Suspect | CR Flag | IIHS Flag | dIIHS-dCR | CR Combo Weight | IIHS Combo Weight | CR Weight | IIHS Weight |
|---|---|---|---|---|---|---|---|---|---|---|---|---|---|---|
| 2 | 9 | 9 | 9 | 9 | 9 | 9 | 0 | 0 | 0 | 9 | 9 | 9 | 0 | 0 |
| 3 | 0 | 0 | −3 | 0 | −3 | 0 | 0 | 0 | 0 | 9 | 9 | 9 | 0 | 0 |
| 3 | 0 | 1 | −2 | 0 | −3 | 0 | 0 | 0 | 0 | 9 | 9 | 9 | 0 | 0 |
| 3 | 0 | 2 | −1 | 0 | −3 | 0 | 0 | 0 | 0 | 9 | 9 | 9 | 0 | 0 |
| 3 | 0 | 3 | 0 | 1 | −3 | 0 | 0 | 0 | 1 | 9 | 9 | 9 | 0 | 1 |
| 3 | 0 | 9 | 9 | 9 | −3 | 0 | 0 | 0 | 0 | 9 | 9 | 9 | 0 | 0 |
| 3 | 1 | 0 | −3 | 0 | −2 | 0 | 1 | 0 | 0 | 9 | 9 | 9 | 0 | 0 |
| 3 | 1 | 1 | −2 | 0 | −2 | 0 | 0 | 0 | 0 | 9 | 9 | 9 | 0 | 0 |
| 3 | 1 | 2 | −1 | 0 | −2 | 0 | 0 | 0 | 0 | 9 | 9 | 9 | 0 | 0 |
| 3 | 1 | 3 | 0 | 1 | −2 | 0 | 0 | 0 | 1 | 9 | 9 | 9 | 0 | 1 |
| 3 | 1 | 9 | 9 | 9 | −2 | 0 | 0 | 0 | 0 | 9 | 9 | 9 | 0 | 0 |
| 3 | 2 | 0 | −3 | 0 | −1 | 0 | 2 | 0 | 0 | 9 | 9 | 9 | 0 | 0 |
| 3 | 2 | 1 | −2 | 0 | −1 | 0 | 1 | 0 | 0 | 9 | 9 | 9 | 0 | 0 |
| 3 | 2 | 2 | −1 | 0 | −1 | 0 | 0 | 0 | 0 | 9 | 9 | 9 | 0 | 0 |
| 3 | 2 | 3 | 0 | 1 | −1 | 0 | 0 | 0 | 1 | 9 | 9 | 9 | 0 | 1 |
| 3 | 2 | 9 | 9 | 9 | −1 | 0 | 0 | 0 | 0 | 9 | 9 | 9 | 0 | 0 |
| 3 | 3 | 0 | −3 | 0 | 0 | 1 | 3 | 0 | 0 | 9 | 9 | 9 | 0 | 0 |
| 3 | 3 | 1 | −2 | 0 | 0 | 1 | 2 | 0 | 0 | 9 | 9 | 9 | 0 | 0 |
| 3 | 3 | 2 | −1 | 0 | 0 | 1 | 1 | 1 | 0 | 9 | 9 | 9 | 1 | 0 |
| 3 | 3 | 3 | 0 | 1 | 0 | 1 | 0 | 1 | 1 | 0 | 1 | 1 | 1 | 1 |
| 3 | 3 | 9 | 9 | 9 | 0 | 1 | 0 | 1 | 0 | 9 | 9 | 9 | 1 | 0 |
| 3 | 9 | 0 | −3 | 0 | 9 | 9 | 0 | 0 | 0 | 9 | 9 | 9 | 0 | 0 |
| 3 | 9 | 1 | −2 | 0 | 9 | 9 | 0 | 0 | 0 | 9 | 9 | 9 | 0 | 0 |
| 3 | 9 | 2 | −1 | 0 | 9 | 9 | 0 | 0 | 0 | 9 | 9 | 9 | 0 | 0 |
| 3 | 9 | 3 | 0 | 1 | 9 | 9 | 0 | 0 | 1 | 9 | 9 | 9 | 0 | 1 |
| 3 | 9 | 9 | 9 | 9 | 9 | 9 | 0 | 0 | 0 | 9 | 9 | 9 | 0 | 0 |

Where a "9" indicates Not Applicable ("N/A"), and, in column one, subject vehicle crash test based rating, indicates the damage rating assigned to the subject vehicle. In column two, CR indicates the CR rating, and, in column three, IIHS, indicates the IIHS rating. In column four, IIHS-Subject vehicle crash test based rating indicates a difference between the IIHS and Subject vehicle crash test based rating, and, in column five, IIHS Applicability indicates whether the IIHS test is applicable, i.e. is IIHS>Subject vehicle crash test based rating, 1=Applicable and 0=N/A. Similarly, in column six, CR-Subject vehicle crash based rating indicates a difference between the CR and subject vehicle crash test based rating, and, in column seven, CR Applicability indicates whether the IIHS test is applicable, i.e. is IIHS>Subject vehicle crash test based rating, 1=Applicable and 0=N/A.

In column eight, Case is Suspect indicates that the CR-IIHS value is greater than zero. Since the IIHS is considered a higher energy test than the CR crash test, the multi-method ΔV combination generator 232 preferably considers cases where the CR rating exceeds the IIHS rating to be suspect. The higher CR-IIHS, the more suspect, and, if CR-IIHS is greater than or equal to two, the respective crash test ratings based ΔV's are not compared with the ΔV from the ΔV crush determination module 216. In columns nine and ten, respectively, the CR Flag and IIHS Flag indicate a "1" if there is a respective crash test and the respective crash tests are applicable and not suspect. Otherwise, the CR Flag and IIHS Flag are respectively "0".

Column eleven is the difference between columns four and six, that is the difference between the differences of the crash tests and the subject vehicle rating. This provides an indication of the proximity of the individual crash tests to the subject vehicle. This column is applicable only when both crash tests are available and applicable. When this column is greater than zero, then the CR test rating is closer to the subject vehicle, when the number is negative, IIHS is closer. Columns twelve and thirteen are applicable when both crash tests are available and applicable and take into account the information in column eleven as well as columns four and six. If dIIHS-dCR is greater than zero, then the CR combo weight is increased by dIIHS-dCR. If dIIHS-dCR is less than zero, then IIHS combo weight is increased by dIIHS-dCR. CR WT and IIHS WT are the same as the CR combo weight and IIHS WT when both crash tests apply. If only one test is available and applicable, then the CR WT or IIHS WT is one plus the difference between the test and the subject vehicle.

Table 12 shows the preferred combinations of CR and IIHS tests and the damage rating assigned by the multi-method ΔV combination generator 232. The resulting weight of CR WT and IIHS WT depends on the strength of the information provided by the respective crash test methods. The weightings in columns eleven and twelve, CR WT and IIHS WT, respectively, are defined as follows:

0=No weight is given to the crash test ΔV's

1=The crash test ΔV is counted equally with the ΔV crush determination module 216 ΔV.

2=The crash test ΔV is counted twice to the ΔV crush determination module 216 ΔV one time.

3=The crash test ΔV is counted three times to the ΔV crush determination module 216 ΔV one time.

4=The crash test ΔV is counted four times to the ΔV crush determination module 216 ΔV one time.

A higher number for the weighting indicates that the crash test rating is closer to the subject accident rating (i.e. the subject accident is more represented by one of the crash tests than the other). "Counted" indicates that the respective ΔV populations from crash test ΔV operation 210, conservation of momentum operation 212, if applicable, and ΔV crush determination module 216 are sampled in accordance with the weighting factor. Thus, when one ΔV population is sampled more heavily than another, the more heavily sampled ΔV population has a stronger influence on the final subject vehicle ΔV, which is also a range of subject vehicle velocity changes.

If the weighting is greater than 0 for a particular crash test, multi-method ΔV combination generator 232 will perform a well-known "t-test" on the distributions of ΔV from the respective ΔV populations. If the t-test indicates that the ΔV crush determination module 216 based populations and the crash test ΔV operation 210 based populations are from the same population with a, for example, 95% confidence level, then multi-method ΔV combination generator 232 will respectively weight the crash test ΔV operation 210 populations in accordance with Table 12 and combine the weighted ΔV populations with the ΔV crush determination module 216 based population to obtain a new population having a range of ΔV's which form the expected ΔV 234 and its distribution. This combination methodology is based on a greater confidence in an actual crash test performed on the subject vehicle as compared to the ΔV crush determination module 216 that uses a class stiffness to determine the ΔV range.

If the t-test fails, i.e. determines that the ΔV crush determination module 216 based populations and the crash test ΔV operation 210 based populations are of different populations, the ΔV crush determination module 216 based distribution is not used and the multi-method ΔV combination generator 232 uses the crash test ΔV operation 210 based distribution(s) only.

While the invention has been described with respect to the embodiments and variations set forth above, these embodiments and variations are illustrative and the invention is not to be considered limited in scope to these embodiments and variations. For example, other crash test information may be used in conjunction with or in substitute of the IIHS and CR crash tests. Additionally, fuzzy logic may be used to combine the ΔV's generated by crash test ΔV operation 210 and ΔV crush determination module 216. Furthermore, hazy logic may be used to develop crash test ratings, damage ratings for the subject vehicles, the comparison between the crash test and the subject accident and to determine, from the component damage, the existence of bumper override/underride. Accordingly, various other embodiments and modifications and improvements not described herein may be within the spirit and scope of the present invention, as defined by the following claims.

What is claimed is:

1. A computer system comprising:

a processor;

computer readable medium coupled to the processor;

first computer code, encoded in the computer readable medium and executable by the processor, for generating a first graphical user interface, wherein the first graphical user interface includes a first screen object representing a vehicle, a second screen object having data entry fields to allow entry of damaged vehicle components and repair/replace estimate information;

second computer code, encoded in the computer readable medium and executable by the processor, for generating a second graphical user interface, wherein the second graphical user interface includes a third screen object representing the vehicle, and a fourth screen object having data entry fields to allow entry of damaged vehicle components and visual damage information;

third computer code, encoded in the computer readable medium and executable by the processor, for rating damage severity of each vehicle component according to a set of predetermined rules with regard to said repair/replace information;

fourth computer code, encoded in the computer readable medium and executable by the processor, to determine an overall damage rating for the vehicle based on rated damage to the vehicle components;

fifth computer code, encoded in the computer readable medium and executable by the processor, to compare the overall damage rating for the vehicle to a crash test vehicle having an overall rating based on component damage ratings in accordance with the set of rules; and sixth computer code, encoded in the computer readable medium and executable by the processor, for determining change in the vehicle's velocity as a result of a collision, the change in the vehicle's velocity being based on the damaged vehicle components and the component damage ratings.

2. The computer system of claim 1 further comprising:

seventh computer code, encoded in the computer readable medium and executable by the processor, for determining an overall vehicle damage rating based on at least one component damage rating; and eighth computer code, encoded in the computer readable medium and executable by the processor, for comparing the overall vehicle damage rating to a crash test vehicle damage rating to determine whether to use crash test data to determine the change in the vehicle's velocity.

3. The computer system of claim 2 further comprising:

ninth computer code, encoded in the computer readable medium and executable by the processor, for determining whether to use crash test data to estimate change in the vehicle's velocity based on the location of damaged components.

4. The computer system of claim 2 further comprising:

ninth computer code, encoded in the computer readable medium and executable by the processor, for comparing the location of damaged components on vehicles involved in the same collision to determine whether to use crash test data to estimate the change in velocity for at least one of the vehicles.

5. The computer system of claim 2 further comprising:

ninth computer code, encoded in the computer readable medium and executable by the processor, for comparing characteristics of a damaged vehicle to characteristics of vehicles for which crash test data is available, and determining whether crash test data for a particular vehicle is applicable to the damaged vehicle.

6. The computer system of claim 2 further comprising:

ninth computer code, encoded in the computer readable medium and executable by the processor, for generating a coefficient of restitution for estimating the change in the vehicle's velocity.

7. The computer system of claim 6 further comprising:

tenth computer code, encoded in the computer readable medium and executable by the processor, for estimating closing velocity based on an estimate of the coefficient of restitution.

8. The computer system of claim 7 further comprising:

eleventh computer code, encoded in the computer readable medium and executable by the processor, for determining a distribution of changes in velocity by varying parameters used to estimate the change in velocity; and twelfth computer code, encoded in the computer readable medium and executable by the processor, for estimating statistical error in the distribution of changes in velocity.

9. The computer system of claim 8 further comprising:

thirteenth computer code, encoded in the computer readable medium and executable by the processor, for varying parameters according to statistical distribution functions.

10. The computer system of claim 8 further comprising:

thirteenth computer code, encoded in the computer readable medium and executable by the processor, for estimating the distribution of changes in velocity using stochastic simulation.

11. The computer system of claim 6 further comprising:

tenth computer code, encoded in the computer readable medium and executable by the processor, for modifying stiffness parameters based on the position of the vehicle's bumper relative to the position of another vehicle's bumper.

12. The computer system of claim 2 further comprising:

ninth computer code, encoded in the computer readable medium and executable by the processor, for determining the change in the vehicle's velocity using conservation of momentum; and tenth computer code, encoded in the computer readable medium and executable by the processor, for determining whether to use the change in the vehicle's velocity based on the crash data, or the change in the vehicle's velocity based on conservation of momentum, as input to a multi-method change in velocity combination generator.

13. The computer system of claim 2 further comprising:

ninth computer code, encoded in the computer readable medium and executable by the processor, for computationally estimating the change in a vehicle's velocity as a result of a collision based on crush threshold energy.

14. The computer system of claim 13 further comprising:

tenth computer code, encoded in the computer readable medium and executable by the processor, for estimating deformation energy based on a one-way spring model.

15. The computer system of claim 2 further comprising:

ninth computer code, encoded in the computer readable medium and executable by the processor, for estimating principal forces based on at least one stiffness parameter and the depth information.

16. The computer system of claim 15 further comprising:

tenth computer code, encoded in the computer readable medium and executable by the processor, for comparing principal forces for at least two vehicles and determining whether the stiffness parameters and the depth information may be adjusted within predetermined thresholds to substantially balance the principal forces.

17. The computer system of claim 16 further comprising:

eleventh computer code, encoded in the computer readable medium and executable by the processor, for comparing principal forces for at least two vehicles and determining whether vehicle parameters may be adjusted within predetermined thresholds to substantially balance the principal forces.

18. The computer system of claim 1 further comprising:

seventh computer code, encoded in the computer readable medium and executable by the processor, for estimating the change in the vehicle's velocity as a result of a collision based on a plurality of estimation methods including estimation based on one set of crash test data, estimation based on another set of crash test data, and estimation based on conservation of momentum; and eighth computer code, encoded in the computer readable medium and executable by the processor, for weighting the results of each estimation method and combining the weighted estimates to determine a final estimate for the change in the vehicle's velocity.

19. The computer system of claim 18 further comprising:

ninth computer code, encoded in the computer readable medium and executable by the processor, for using a statistical method for weighting the results of each estimation method.

20. The computer system of claim 19 wherein the statistical method for weighting the results of each estimation method is the t-test.

21. A computer-implemented method for estimating the change in velocity of a vehicle as a result of a collision, the method comprising:

(a) acquiring information regarding damaged components of at least one vehicle, said information comprising repair/replace estimate information;

(b) assigning a damage rating to the at least one vehicle said damage rating based on at least in part on said repair/replace estimate information;

(c) determining whether to utilize crash test data for a first estimate of the change in velocity for the at least one vehicle based at least partially on the damage rating;

(d) determining a second estimate of the change in velocity for the at least one vehicle based on conservation of momentum;

(e) determining a third estimate of the change in velocity for the at least one vehicle based on deformation energy; and (f) determining a final estimate of the change in velocity for the at least one vehicle based on at least one of the first, second, and third estimates of the change in velocity.

22. The method, as set forth in claim 21, wherein (c) further comprises:

determining whether to utilize crash test data for a first estimate of the change in velocity for the at least one vehicle based on the location of damaged components.

23. The method, as set forth in claim 21, wherein (c) further comprises:

comparing the location of damaged components on vehicles involved in the same collision to determine whether to use crash test data to determine the change in at least one of the vehicles' velocity.

24. The method, as set forth in claim 21, wherein (c) further comprises:

comparing characteristics of a damaged vehicle to characteristics of vehicles for which crash test data is available, and determining whether crash test data for a particular vehicle is applicable to the damaged vehicle.

25. The method, as set forth in claim 21, wherein (e) further comprises:

estimating principal forces based on at least one stiffness parameter and the depth information.

26. The method, as set forth in claim 21, wherein (e) further comprises:

comparing principal forces for at least two vehicles and determining whether vehicle parameters may be adjusted within predetermined thresholds to substantially balance the principal forces.

27. The method, as set forth in claim 21, wherein (e) further comprises:

determining a distribution of changes in velocity by varying parameters used to determine the change in velocity and estimating statistical error in the distribution of changes in velocity as a result of said collision.

28. The method, as set forth in claim 21, wherein (e) further comprises:

varying parameters according to a stochastic simulation, said stochastic simulation performed automatically.

29. The method, as set forth in claim 21, wherein (e) further comprises:

modifying stiffness parameters based on the position of the vehicle's bumper relative to the position of another vehicle's bumper.

30. The method, as set forth in claim 21, wherein (f) further comprises:

weighting the first, second, and third estimates of the change in velocity and combining the weighted estimates to determine the final estimate for the change in the vehicle's velocity.

31. The method, as set forth in claim 30, wherein (f) further comprises using a statistical method for weighting the results of each estimation method.

32. A computer-implemented method for estimating the change in velocity of a vehicle as a result of a collision, the method comprising:

(a) acquiring information regarding damaged components of at least one vehicle, said information comprising repair/replace estimate information;

(b) assigning a damage rating to the at least one vehicle, said damage rating based on at least in part on said repair/replace estimate information said damage rating comprising a damage severity indicator for each of said damaged components of the at least one vehicle;

(c) comparing said damage rating to a crash test rating of the at least one vehicle;

(d) determining a first estimate of the change in velocity for the at least one vehicle based on crash test data if the crash test rating is greater than the damage rating;

(e) determining a second estimate of the change in velocity for the at least one vehicle based on conservation of momentum;

(f) determining a third estimate of the change in velocity for the at least one vehicle based on deformation energy; and (g) determining a final estimate of the change in velocity for the at least one vehicle based on at least one of the first, second, and third estimates of the change in velocity.

33. The method, as set forth in claim 32, said damage rating comprising a first zone corresponding to a vertical measure of a bumper of the at least one vehicle and a second zone corresponding to a vertical measure above said bumper of the at least one vehicle.

34. The method, as set forth in claim 33, further comprising analyzing whether an override/underride condition.

35. The method, as set forth in claim 34, wherein said analyzing comprises a review of said first zone and said second zone of said damage rating.

36. The method, as set forth in claim 32, wherein said damage rating comprises an overall damage rating corresponding to a highest rating for each of said components of said vehicle.

37. The method, as set forth in claim 36, further comprising adjusting stiffness values of the at least one vehicle based upon presence of said override/underride condition.

38. The method, as set forth in claim 32, wherein said final estimate is determined by weighting the results of said first, second and third estimates and determining a final estimate therefrom.

* * * * *

UNITED STATES PATENT AND TRADEMARK OFFICE

CERTIFICATE OF CORRECTION

PATENT NO. : 6,381,561 B1 Page 1 of 1
DATED : April 30, 2002
INVENTOR(S) : John B. Bomar, Jr., David J. Pancratz, Darrin A. Smith and Scott D. Kidd It is certified that error appears in the above-identified patent and that said Letters Patent is hereby corrected as shown below:

Column 39,
Lines 36-37, delete "based on at least in part on said repair/replace estimate information" and insert -- comprising a damage severity indicator for each of said damaged components of the at least one vehicle --
Lines 38-39, delete "comprising a damage severity indicator for each of said damaged components of the at least one vehicle;" and insert -- based on at least in part on said repair/replace estimate information; --

Signed and Sealed this

Twelfth Day of November, 2002

*Attest:*

JAMES E. ROGAN

*Attesting Officer* *Director of the United States Patent and Trademark Office*